US009667981B2

(12) United States Patent
Xu et al.

(10) Patent No.: US 9,667,981 B2
(45) Date of Patent: May 30, 2017

(54) RATE CONTROL FOR CONTENT TRANSCODING

(75) Inventors: Long Xu, Beijing (CN); Sam Tak Wu Kwong, QuarryBay (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 1334 days.

(21) Appl. No.: 13/444,709

(22) Filed: Apr. 11, 2012

(65) Prior Publication Data

US 2013/0272383 A1    Oct. 17, 2013

(51) Int. Cl.
| | |
|---|---|
| H04N 19/40 | (2014.01) |
| H04N 19/172 | (2014.01) |
| H04N 19/124 | (2014.01) |
| H04N 19/152 | (2014.01) |
| H04N 19/154 | (2014.01) |

(52) U.S. Cl.
CPC .......... *H04N 19/40* (2014.11); *H04N 19/124* (2014.11); *H04N 19/152* (2014.11); *H04N 19/172* (2014.11); *H04N 19/154* (2014.11)

(58) Field of Classification Search
CPC ..................................................... H04N 19/40
See application file for complete search history.

(56) References Cited

U.S. PATENT DOCUMENTS

| | | | |
|---|---|---|---|
| 6,590,936 B1 * | 7/2003 | Kadono | H04N 19/61 375/240.03 |
| 7,170,938 B1 | 1/2007 | Cote et al. | |
| 7,263,126 B2 | 8/2007 | Zhao et al. | |
| 7,356,079 B2 | 4/2008 | Laksono et al. | |
| 2003/0095594 A1 | 5/2003 | Laksono et al. | |
| 2007/0098064 A1 | 5/2007 | Au et al. | |
| 2008/0112483 A1 | 5/2008 | Lu et al. | |
| 2008/0123741 A1 * | 5/2008 | Li | H04N 19/102 375/240.12 |

(Continued)

FOREIGN PATENT DOCUMENTS

EP    2200320    6/2010

OTHER PUBLICATIONS

Vetro, C. Christopoulos and H. Sun, "Video transcoding architectures and techniques: an overview," IEEE Signal Processing Magazine, vol. 20, No. 2, pp. 18-29, Mar. 2003.

(Continued)

*Primary Examiner* — James Pontius
(74) *Attorney, Agent, or Firm* — Amin, Turocy & Watson, LLP

(57) ABSTRACT

The disclosed subject matter relates to rate control aspects for content transcoding. A rate control scheme for transcoding is disclosed that is considerate of quantization parameters related to an encoded input content stream and when transcoding the input content stream into an output content stream. Quantization parameters can be determined for an encoded input content stream by parsing the stream. These can be combined with a rate-distortion model for transcoding to determine transcoding quantization parameters. Further, iteratively applying the derived rate-distortion model to windows of frames during transcoding can facilitate real-time two-pass transcoding. Window size can be based on buffer constraints. Moreover, a sliding window buffer check scheme can be employed to avoid buffer constraint violations.

24 Claims, 16 Drawing Sheets

(56) References Cited

U.S. PATENT DOCUMENTS

2009/0219440 A1 9/2009 Maertens et al.
2011/0002381 A1 1/2011 Yang et al.

OTHER PUBLICATIONS

H. Sun, W. Kwok, and J. W. Zdepski, "Architectures for mpeg compressed bitstream scaling," IEEE Trans. Circuits Syst. Video Technol., vol. 6, No. 2, pp. 191-199, Apr. 1996.

Y. Nakajima, H. Hori, and T. Kanoh, "Rate conversion of MPEG coded video by re-quantization process," in Proc. of IEEE ICIP1995, vol. 3, pp. 408-411, Oct. 1995.

P. Yin, A. Vetro, B. Liu, and H. Sun, "Drift compensation for reduced spatial resolution transcoding," IEEE Trans. Circuits Syst. Video Technol., vol. 12, No. 11, pp. 1009-1020, Nov. 2002.

Assuncao, et al., "A frequency-domain video transcoder for dynamic bit-rate reduction of mpeg-2 bit streams," IEEE Trans. Circuits and Syst. Video Technol., vol. 8, No. 8, pp. 953-967, Dec. 1998, 15 pages.

G. J. Shen, Y. He, W. Cao, and S. Li, "MPEG-2 to WMV transcoder with adaptive error compensation and dynamic switches," IEEE Trans. Circuits and Syst. Video Technol., vol. 16, No. 12, pp. 1460-1476, Nov. 2006.

Q. Tang and P. Nasiopoulos, "Efficient motion re-estimation with rate-distortion optimization for MPEG-2 to H.264/AVC transcoding," IEEE Trans. Circuits and Syst. Video Technol., vol. 20, No. 2, pp. 262-274, Feb. 2010.

De Cock, et al., "Architectures for fast transcoding of H.264/AVC to quality-scalable SVC streams," IEEE Trans. Multimedia, vol. 11, No. 7, pp. 1209-1224, Nov. 2009, 16 pages.

Wu, et al., "A collaborative transcoding strategy for live broadcasting over peer-to-peer IPTV networks," IEEE Trans. Circuits Syst. Video Technol., vol. 21, No. 2, pp. 220-224, Feb. 2011, 10 pages.

G. Fernandez-Escribano, H. Kalva, J. L. Martinez, P. Cuenca, L. Orozco-Barbosa, and A. Garrido, "An MPEG-2 to H.264 video transcoder in the baseline profile," IEEE Trans. Circuits and Syst. Video Technol., vol. 20, No. 5, pp. 763-768, May 2010.

Pantoja, et al., "A two-level rate control approach for video transcoding," in Proc. of IEEE ICIP2009, pp. 3701-3704, Nov. 2009, 4 pages.

Pantoja, et al., "Low complexity rate control for VC-1 to H.264/AVC transcoding," in Proc. of IEEE ISCAS2009, pp. 888-891, May 2009.

X. Y. Xiu, L. Zhuo, and L. S. Shen, "A H.264 bit rate transcoding scheme on PID control," in Proc. of IEEE ISCIT2005, pp. 1039-1042, Oct. 2005.

Y. -N. Xiao, H. Lu, X. Y. Xue, V. -A. Nguyen, and Y. -P. Tan, "Efficient rate control for MPEG-2 to H.264/AVC transcoding," in Proc. of IEEEISCAS 2005, pp. 1238-1241, May 2005.

Wang, et al., "Adaptive rate control for dynamic bandwidth in video transcoding," in Proc. of IEEE ICCS2008, pp. 773-777, Nov. 2008, 5 pages.

J. Y Yang, Q. H Dai, W. L. Xu, and R. Ding, "A rate control algorithm for MPEG-2 to H.264 real-time transcoding," in Proc. of IEEE ICIP2005, pp. 1995-2003, Sep. 2005.

Y. Liu and Z. G. Li, "A novel rate control scheme for low delay video communication of H.264/AVC standard", IEEE Trans. Circuits Syst. Video Technol., vol. 17, No. 1, pp. 68-78, Jan. 2007.

S. W. Ma, Z. G. Li, and F. Wu, "Proposed draft adaptive rate control," Joint Video Team (JVT) of ISO/IEC MPEG &ITU-T VCEG, 8th Meeting, Doc. JVT-H017r3, Geneva, May 2003.

Westerink, et al., "Two-pass MPEG-2 variable-bit-rate encoding," IBM J.Res. Develop, vol. 43, No. 4, pp. 471-488, Jul. 1999.

J. Ribas-Corbera, P. A. Chou, and S. L. Regunathan, "A generalized hypothetical reference decoder for H.264/AVC," IEEE Trans. Circuits Syst. Video Technol., vol. 13, No. 7, pp. 674-687, Jul. 2003.

"Time-Shift Causality Constraint on the CAT-LBHRD," Joint Video Team (JVT) of ISO/IEC MPEG &ITU-T VCEG, 5th Meeting, Doc. JVT-E133, Geneva, Oct. 2002.

Xu, et al., "Window-level rate control for smooth picture quality and smooth buffer occupancy," IEEE Trans. Image Processing, vol. 20, No. 3, pp. 723-734, Mar. 2011, 4 pages.

Xu, et al., "A Universal Rate Control Scheme for Video Transcoding", IEEE transactions on circuits and systems for video technology, Sep. 15, 2011, 14 pages.

Kamaci, et al., "Frame bit allocation for the H.264/AVC video coder via Cauchy-Density-Based rate and distortion models" IEEE Trans. on Circuits Syst. Video Technol., vol. 15, No. 8, pp. 994-1006, Aug. 2005, 13 pages.

G. Bjontegaard, "Calculation of average PSNR differences between RD-Curves," ITU-T SG16Q.6 Doc. VCEG-M33, Austin, Apr. 2001.

Seo, et al. "Rate Control Algorithm for Fast Bit-Rate Conversion Transcoding," IEEE Transactions on Consumer Electronics, vol. 46, No. 4, pp. 1128-1136, Nov. 2000, 9 pages.

Lei, et al. "Accurate Bit Allocation and Rate Control for Dct Domain Video Transcoding," Canadian Conference on Electrical and Computer Engineering( IEEE CCECE 2002). vol. 2, pp. 968-973, 2002, 6 pages.

\* cited by examiner

EXEMPLARY "BITS REALLOCATION OF TWO-PASS TRANSCODING" PSEUDO-CODE

```
Initialization:
    Y = ∑_{i=0}^{N-1} b_{i,j}, Z = N × R/F_r, μ = Z / ∑_{i=0}^{N-1} b_{i,j}(Q_i)^γ, η = Y / ∑_{i=0}^{N-1} b_{i,j}(Q_i)^γ
    L = 1E-7 × μ, U = 1E+4 × μ, L_1 = 1E-7 × η, U_1 = 1E+4 × η;
    b^c_{i,j} = b_{i,j} and Q^c_{i,j} = Q_{i,j};
    k = 0, d = 0, j=0;

for ( d = U to L, d *= 0.5 ; j++ )
    k += d ;
    Compute {b^j_{i,j}} as b^j_{i,j} = k × b^{j-1}_{i,j}(Q^{j-1}_{i,j})^γ (j>1) based on R_{i,j} = k(Q_{i,j})^γ (see Eq. (10) hereinabove);
    Scale {b^j_{i,j}} as b^j_{i,j} = s × b^j_{i,j} ;
    Compute {Q^j_{i,j}} from {b^j_{i,j}} as Q^j_{i,j} = b^{j-1}_{i,j} × Q^{j-1}_{i,j} / b^j_{i,j} ;
    Scale {Q^j_{i,j}} as Q^j_{i,j} = Q^j_{i,j} / ⁿ√μ ;
    if ∑ b^j_{i,j} > Z
        k -= d ;
    end if
end for
if (Y > T)
    for ( d = U_1 to L_1, d *= 0.5 ; j++ )
        k += d ;
        Compute both {b^j_{i,j}(Q_i)} as b^j_{i,j}(Q_i) = k × b^{j-1}_{i,j}(Q_i) × (Q^{j-1}_{i,j})^γ (j >1) according to R_{i,j} = k(Q_{i,j})^γ
    (see Eq. (10) hereinabove);
        (b^j_{i,j}(Q_i) refers to the bits reallocation at the bit rate of encoding but not target bit rate)
        Compute {b^j_{i,j}} again as b^j_{i,j} = r × b^j_{i,j}(Q_i) + (s - r) × b^j_{i,j} ;
        Compute {Q^j_{i,j}} from {b^j_{i,j}} as Q^j_{i,j} = b^{j-1}_{i,j} × Q^{j-1}_{i,j} / b^j_{i,j} ;
        Clip {Q^j_{i,j}} as Q^j_{i,j} = max(Q_j, Q^j_{i,j}(Q_i) / ⁿ√μ) ;
        if ∑ b^j_{i,j} > Y
            k -= d ;
        end if
    end for
end if
Q_{i,j} = Q^j_{i,j}
```

FIG. 15

RATE CONTROL FOR CONTENT TRANSCODING

TECHNICAL FIELD

The various embodiments of the subject disclosure relate generally to content transcoding, and more particularly to rate control for content transcoding.

BACKGROUND

Content transcoding is widely used in content delivery applications, such as video streaming applications, which can include video-on-demand, Cable television (TV) programming, live TV over the internet, accessing content by way of social media providers, etc. Content delivery applications often facilitate access to the same body of content but with different formats, compression ratios, frame dimensions, etc. As an example, watching a video program on a desktop computer will often be at a higher bitrate, larger frame size, and better resolution than watching the same video program on a mobile phone. In these types of situations, frequently, a high quality video stream is recorded and stored at a server. The high quality video stream then can be adapted to the output bit rates, temporal/spatial resolutions and video formats for delivery to different terminal devices and over different channels or carrier services. In transcoding, both accurate bit rate and a consistent visual quality are generally desirable.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter can include a system that facilitates transcoding. The system can include a decoder component, a transcoder component, and an encoder component. The transcoder component can generate at least on transcoding control value related to the encoding of the input stream. The encoding component can encode a decoded input content stream into an output content stream based, at least in part, on the transcoding control value.

In another embodiment, the disclosed subject matter can be in the form of a method. The method can include determining rate-distortion model parameters for an input content stream. The method can further include decoding the input content stream. A set of quantization parameters is then determined from the rate-distortion model parameters. The decoded input content stream is then encoded into an output content stream, based on the set of quantization parameters.

In a further embodiment, the disclosed subject matter can be in the form of computer-executable instructions stored on a computer-readable storage medium. The computer-executable instructions can include receiving an input content stream, parsing the input content stream, and determining a first set of quantization parameters for the input content stream based on the parsed input content stream. The computer-executable instructions can further include decoding the input content stream into a decoded content stream and accessing a rate-distortion model. Further computer-executable instructions can include determining a a second set of quantization parameters based, at least in part, on the first and second set of quantization parameters and the rat-distortion model. The decoded content stream can then be encoded into an output content steam based on the second set of quantization parameters.

In an additional embodiment, the disclosed subject matter can be a system having a means for decoding an input content stream into a decoded content stream. The system can also include a means for generating a transcoding control value from the quantization values of the input content stream and a rate-distortion model. The system can further include a means for encoding the decoded content stream into an output content stream based on the transcoding control value.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

BRIEF DESCRIPTION OF THE DRAWINGS

FIG. 15 illustrates exemplary pseudo-code for bits reallocation with two-pass content transcoding in accordance with an aspect of the disclosed subject matter.

DETAILED DESCRIPTION

Figure 1:
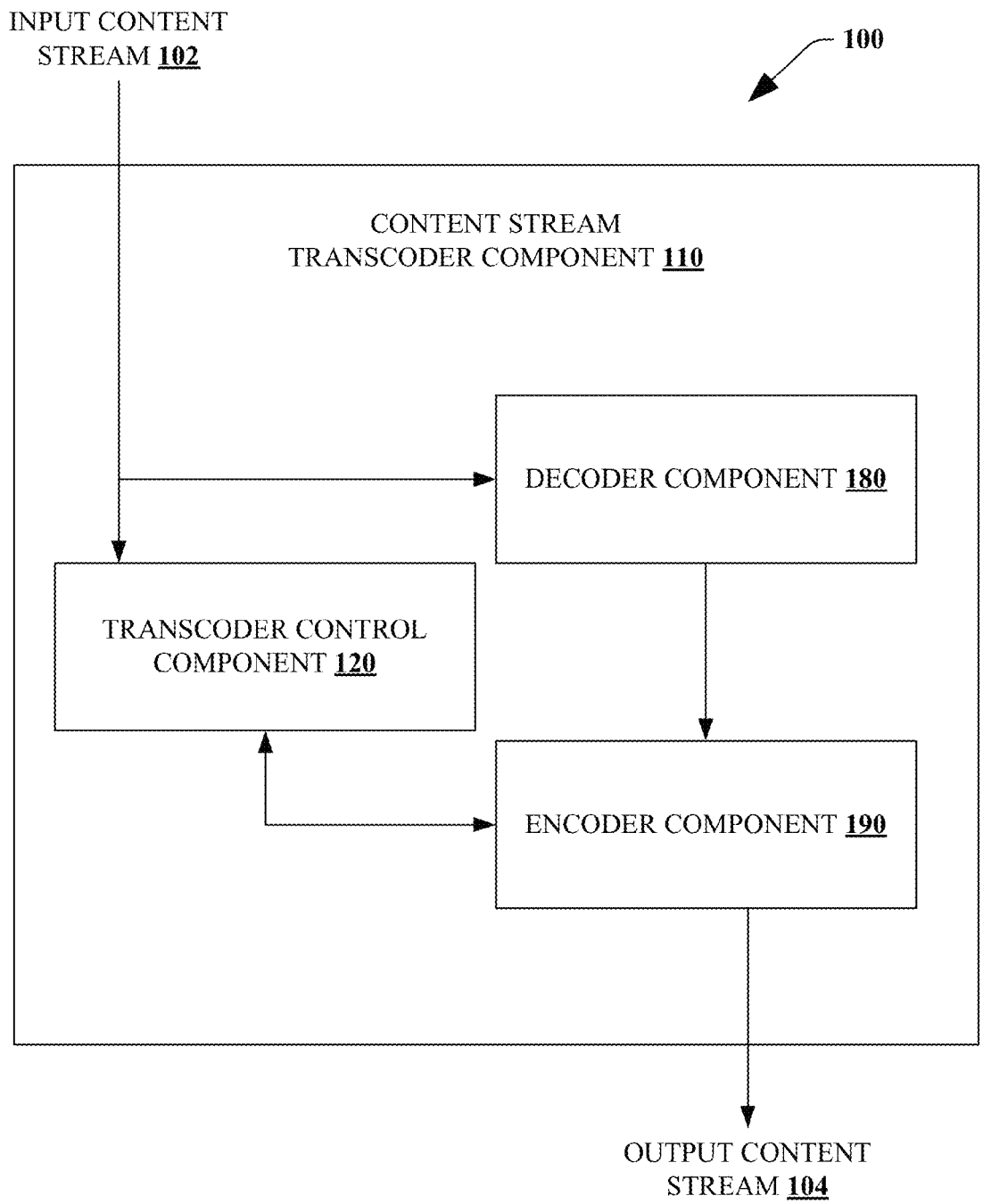
FIG. 1 is a diagram of a system that can facilitate content transcoding in accordance with an aspect of the subject matter disclosed herein.

Content transcoding, the conversion of one content encoding to another content encoding is an important digital technology. Content transcoding, or simply transcoding, is typically employed where a terminal device does not support the current format of the content or has other limitations that would be impediments to using the content in the current format, e.g., limited storage, limited bandwidth, limited processing power, different display capabilities, etc. Transcoding can be done offline, allowing the transcoded encodings to be created and stored for ready access, or at runtime, allowing storage of fewer encodings and creating them on the fly as needed. Often, first encoding of a high quality, typically large, content file can be stored and transcoded to a second, more compressed format, for delivery over a network or the internet to consumers of the content so that less bandwidth is consumed than if the first encoding were delivered. Another common application is transcoding between an older format and a newer format which can facilitate the preservation of access to older content file formats.

Content transcoding can be highly computationally intensive. This computation complexity can lead to relatively long time periods to process the data involved in the transcoding. As such, improved transcoding processes often strive to speed up transcoding. However, faster transcoding can also result in degradation of the quality of the content. It is desirable to maintain the quality of the content while also processing the transcoding at a reasonable speed. Where speed cannot be maintained, transcoding can occur off-line. Off-line transcoding typically consumes more resources as the transcoded content also needs to be stored. It is often desirable that content transcoding occur in real-time.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Rate-Distortion Model for Content Transcoding

In the existing conventional transcoding rate control algorithms, rate-distortion (R-D) models can be the same as those for general encoding of raw content data, and the statistical information of raw content data is typically used for rate control during transcoding. Raw content is generally considered to be content that has not undergone an initial encoding into a compressed format. Transcoding typically acts upon already encoded content data and therefore first decodes and then re-encodes content data instead of simply encoding raw content data in the absence of a decoding step. Statistical information from decoding might not be accurate enough for transcoding at an acceptable quality. There usually exists significant bit control error in transcoding rate control if conventional R-D models are employed in transcoding. The transcoding process is performed on an encoded bit stream generated from the encoding of raw content data and, as such, it can be regarded as including two encoding processes of the raw content data. This suggests that the raw content data is typically quantized twice. The presently disclosed R-D model considers the quantization procedure of the input content stream encoding in the R-D model for transcoding. Therefore, both the quantization in encoding of raw content and quantization in transcoding previously encoded content are introduced in the presently disclosed R-D models.

Turning to the figures, FIG. 1 illustrates a system 100 that can facilitate content transcoding in accordance with an aspect of the subject matter disclosed herein. System 100 can include an input content stream 102 and an output content stream 104 that can be a transcoded form of input content stream 102. In an aspect, transcoding of input content stream 102 into output content stream 104 can occur at content stream transcoder component 110. In an embodiment, transcoding at content stream transcoder component 110 can occur in real-time.

Content stream transcoder component 110 can include transcoder control component 120 that can be communicatively coupled to decoder component 180 and encoder component 190. Content stream transcoder component 110 can receive input content stream 102. Input content stream 102 can then be received by transcoder control component 120 and decoder component 180. Transcoder control component 120 can determine a set of transcoding parameters for the input content stream 102. In an embodiment, these transcoding parameters can be determined by parsing input content stream 102 without first decoding input content stream 102.

Transcoding parameters can include bit rate values. Further, transcoding parameters can include distortion values. Transcoding parameters can be employed in the re-encoding portion of a transcoding operation to determine characteristics of the output content stream including, for example, window size, quality, data rates, etc. Transcoder control component 120 can determine a first set of bit rate values and first set of distortion values based on a first set of predetermined quantization parameters (QPs). As an example using a set of eight determined QPs from 16 to 44 $\{Q_1=16, 18, 20, 22, 24, 28, 36, 44\}$ for input content stream 102, a set of eight bit rate values, $\{R_1(Q_1)\}$, and a set of eight distortion values, $\{D_1(Q_1)\}$, can be determined. Transcoder control component 120 can further determine a second set of bit rate values and second set of distortion values based on the first set of bit rate values and first set of distortion values and a second set of QP's. Continuing the previous example using a second set of QPs allows determination of $\{R_2(Q_1, Q_2)\}$ and $\{D_2(Q_1, Q_2)\}$. In some embodiments, the first set of bit rate values and first set of distortion values can be associated with encoding raw content while the second set of bit rate values and second set of distortion values can be associated with transcoding of previously encoded raw content, e.g., applying the encoding values to re-encoding a decoded input stream to generate an output stream.

Decoder component 180 can decode input content stream 102. The decoded content stream can be made available to other components of system 100. Transcoder control component 120 can receive the decoded content stream. Transcoder control component 120 can parse the content stream to determine the QPs and frame bits usage for the encoding of the input stream. Transcoder control component 120 can then apply a second set of QPs to the decoded content stream to facilitate determination of a second set of bit rate values and second set of distortion values that can be associated with transcoding of the input content stream. In some embodiments, based on the determined first QP and selection of a second QP from the second set of QPs, resulting second bit rate values and second distortion values can be selected to provide the desired balance of performance characteristics for the output content stream 104.

The several sets of bit rate values and QPs can be employed in forming an R-D model for transcoding. Aspects of the R-D model can be made accessible to other components of system 100. In an aspect, transcoder control component 120 can determine transcoding parameters for controlling an encoder based on the R-D model for transcoding features. Encoder component 190 can receive the decoded content stream from decoder component 180 as shown. Further, encoder component 190 can receive bit rate values and distortion values from transcoder control component 120 relating to the encoding of the decoded content stream in furtherance of transcoding input stream 102 into output stream 104. Based, at least in part, on the values received from decoder control component 120, encoder component 190 can encode the decoded content stream into output content stream 104. As such, the encoded content stream, e.g., output content stream 104, can be a transcode of input content stream 102.

Figure 2:
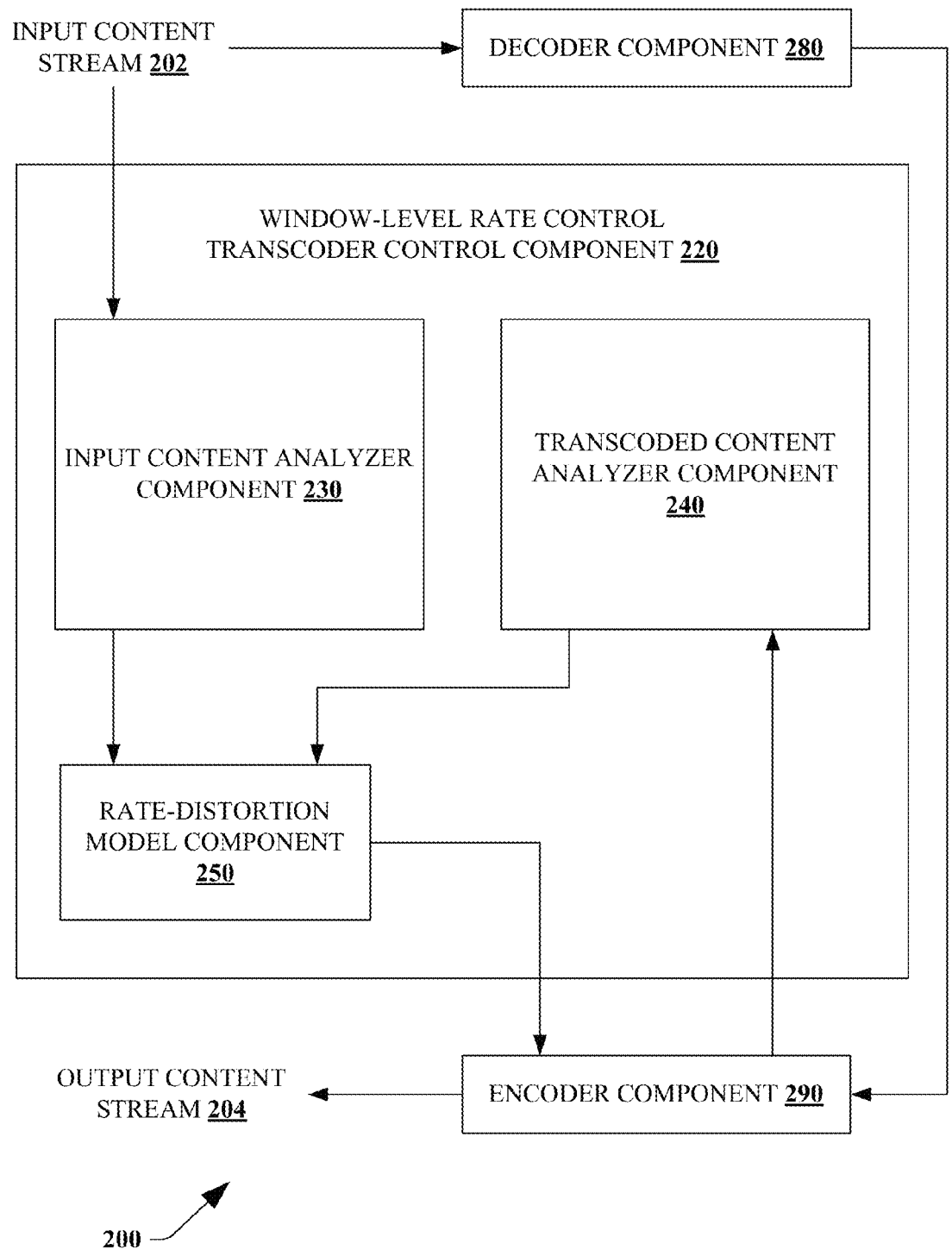
FIG. 2 illustrates a system that can facilitate window-level rate control of content transcoding in accordance with an aspect of the disclosed subject matter.

FIG. 2 depicts a system 200 that can facilitate window-level rate control of content transcoding in accordance with an aspect of the disclosed subject matter disclosed herein. System 200 can include input content stream 202 and output content stream 204. In an aspect, output content stream 204 can be a transcode of input content stream 202. System 200 can also include window-level rate control (WRC) transcoder control component 220, decoder component 280, and encoder component 290. Decoder component 280 can decode input content stream 202 and facilitate access to the decoded content stream by other components of system 200. In an aspect, encoder component 290 can receive the decoded content stream. Encoder component 290 can encode the decoded content stream into output content stream 204. Encoder component 290 can also receive encoding control information from WRC transcoder control component 220 and can provide feedback to WRC transcoder control component 220 relating to encoding parameters employed in generating output content stream 204. In an aspect, encoder component 290 can encode the decoded content stream into output content stream 204 subject to the control information received from WRC transcoder control component 220.

WRC transcoder component 220 can include input content analyzer component 230. Input content analyzer component 230 can analyze received input content stream 202 independent of any decoding of input content stream 202. In an aspect, input content analyzer component can include a parser, not illustrated, for parsing received input content stream 202. The parsed input content stream 202 can be analyzed to determine R-D model features. The R-D model features can include a first set of QPs and frame bit usage values.

WRC transcoder component 220 can further include transcoded content analyzer component 240. Transcoded content analyzer component 240 can determine a set of bit rate values and set of distortion values correlated to sets of QPs. In an aspect, these bit rate values and distortion values can model transcoding of input streams over a set of QPs for the input stream and a set of QPs for the transcoding process. This can facilitate selection of control feature values, e.g., bit rate values and distortion values, based on an input QP and transcoding QP that are associated with an acceptable output content stream performance.

In a further aspect, transcoded content analyzer component 240 can analyze received encoder parameters from encoder component 290 to facilitate selection of control features, e.g. target bitrates, etc., related to providing a satisfactory output content stream. In an aspect, wherein encoder component 290 encodes content subject to control feature values associated with the WRC transcoder component 220, transcoded content analyzer component 240 can be viewed as part of a feedback control loop. The feedback of parameters employed in re-encoding the decoded input stream as part of transcoding can serve to update models employed in transcoded content analyzer component 240, allowing the model to evolve and improve.

WRC transcoder component 220 can further include rate-distortion model component 250. R-D model component 250, in an aspect, can determine R-D model features for re-encoding the decoded content stream based on a window, the window including a set of frames and the window having a window basic unit size. Determining transcoding control values for a window of frames can provide improved performance over determining control values for single frames or entire streams. This can be related to "weighting" control values across several frames to reduce the effect of outlier values that can occur with single frame analysis. As an example, where there are short burst of high action, frame-by-frame determination of control features can result in high data rates for the high action frames, however, the human mind typically cannot determine the difference in detail between a high data rate and low data rate for a high action frame where the high action is short and intermittent. As such, in the example, by windowing across a set of frames, a lower data rate can be selected due to weighting the burst of action, but this degraded performance, e.g., associated with the lower bit rate, is less likely to be observed by a user given that the high action is only in intermittent bursts. Further, weighting for a window of frames that is less than the entire input stream is generally associated with more responsive control feature values. As an example, selecting a single set of control values for transcoding an entire input stream that has high action at one portion of the stream and low action at another portion can result in blurring of the high action portions and excessively large data rates for the low action portion as compared to windowing that can allow for different control feature values for the high action and low action portion of the stream. As such, window basic unit size selection can impact the resulting performance of a transcoding scheme.

R-D model component 250 can access model parameters from transcoded content analyzer component 240, e.g., bit rate values and set of distortion values associated with adequate performance of transcoding. Wherein the bit rate values and set of distortion values already include adjustments based on both the primary encoding of the raw content and the re-encoding of the encoded content, the resulting transcoding can perform better than conventional schemes.

A windowed set of frames will typically be a subset of the full decoded content stream. The R-D model can be updated iteratively as the window is processed. As such, WRC transcoder component 220 can apply the R-D model to windowed portions of the decoded content stream rather than for the full decoded content stream. In an aspect, the window unit size is determined to conform to buffer constraints. Based on the window unit size, applying a two-pass rate control scheme to a window of frames can allow transcoding in real-time as more fully disclosed herein below. R-D model component 250 can make the R-D model features available to other components of system 200.

Encoder component 290 can receive R-D model features from R-D model component 250 and the decoded content stream from decoder components 280. Whereas, the R-D model is based on WRC, encoder component 290 can encode the decoded content stream by window. In an aspect, each window of frames encoded will be based on an updated R-D model because the R-D model is updated by window at R-D model component 250. This can facilitate real-time transcoding with a two-pass rate control scheme and can provide smooth output content by iteratively adjusting the R-D model within each window as disclosed in more detail herein below.

Figure 3:
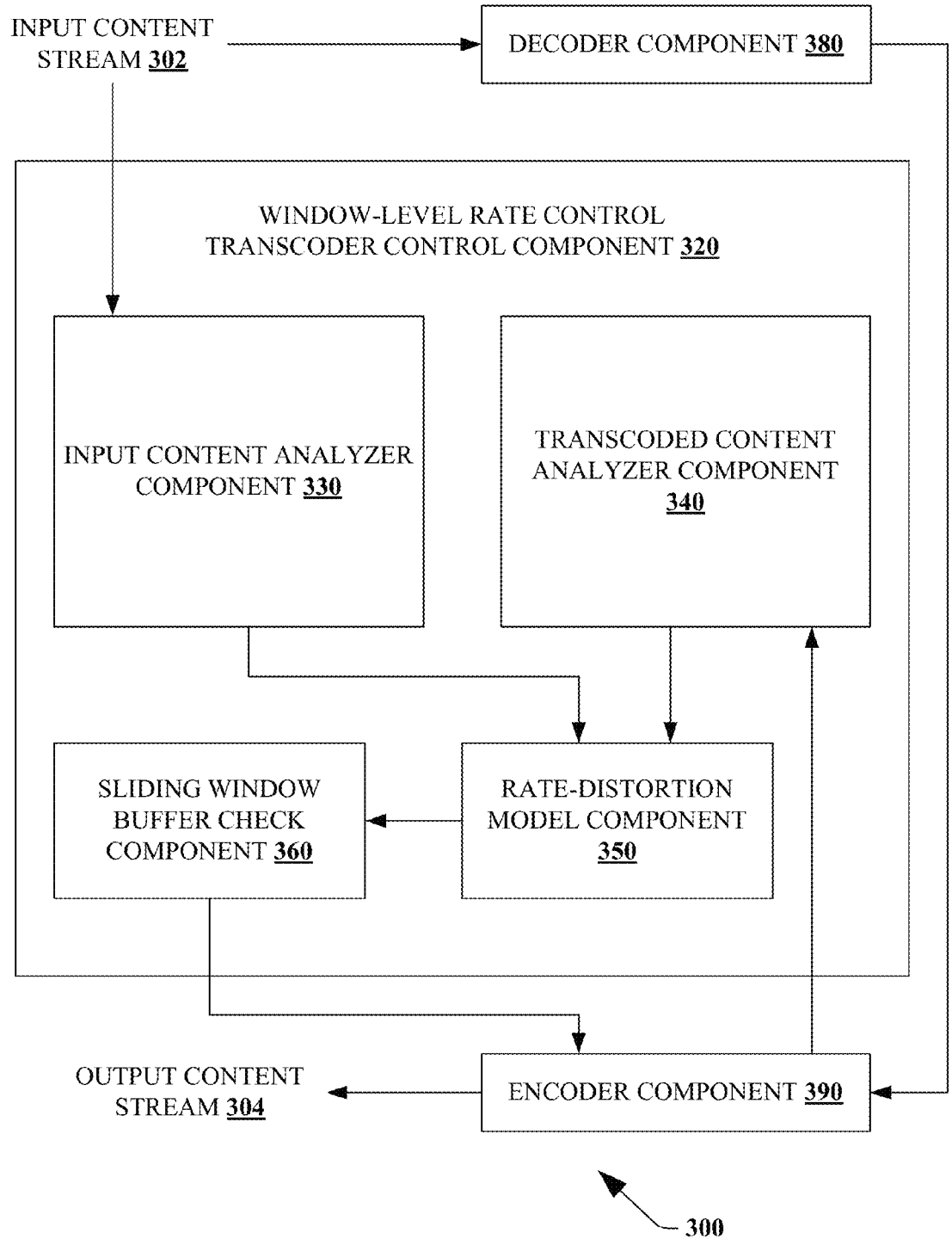
FIG. 3 is a diagram of a system that can facilitate window-level rate control of content transcoding with sliding window buffer check in accordance with an aspect of the disclosed subject matter.

Turning now to FIG. 3, presented is a diagram of a system 300 that can facilitate window-level rate control of content transcoding with sliding window buffer check in accordance with an aspect of the subject matter disclosed herein. System 300 can similar to system 200 and can additionally include sliding window buffer check (SWBC) component 360. SWBC component 360 can check for compliance with buffer constraints in the WRC transcoding. In an aspect the SWBC component 360 can dynamically adjust the QPs of a window of frames if buffer constraints are violated. Further the buffer status can be updated with the actual number of coding bits during transcoding to facilitate accuracy in determining buffer compliance as is explained in more detail herein below.

System 300 can facilitate transcoding from input content stream 302 to output content stream 304 by decoding input content stream 302 at decoder component 380 and receiving input content stream 302 at input content analyzer component 330. Input content analyzer component 330 can determine a first set of QPs associated with the raw encoding of input content stream 302. In an aspect, this first set of QPs can be based on information from parsing input content stream 302 independent of decoding input content stream 302.

The transcoded content analyzer component 340 can apply updated predetermined transcoding models to determine control feature values, e.g., bit rate values and distortion values, based on an input QPs and transcoding QPs that are associated with an acceptable output content stream performance. The decoded content stream, e.g., from decoder component 380, can be analyzed in windowed portions as disclosed elsewhere herein. In an aspect, transcoded content analyzer component 340 can facilitate application of control features to enable re-encoding of decoded content that is considerate of the primary encoding of raw content and re-encoding of encoded content in accordance with a R-D model. The R-D model can be updated by receiving information relating to the re-encoding by way of encoder component 390 as illustrated.

R-D model component 350 can receive the R-D model features, or parts thereof, from input content analyzer component 330 and transcoded content analyzer component 340. R-D model component 350 can determine transcoding control values therefrom. In an aspect, R-D model component 350 can facilitate transcoding input content stream 302 into output content stream 304 in a windowed manner that can provide real-time transcoding, the window including a set of frames and the window having a window basic unit size. Further, in an aspect, the windowed processing can provide for smoother output content streams than traditional two-pass rate control schemes because the R-D model can be updated by window.

SWBC component 360 can pass transcoding control information between R-D model component 360 and encoder component 390. In an aspect, SWBC component 360 can check compliance with buffer constraints. In a further aspect, SWBC component 360 can adjust transcoding control information or the R-D model based on non-compliant buffer conditions. As an example, where the buffer (not illustrated) overflows, SWBC component 360 can adjust the QPs to correct the condition and return the buffer to a compliant condition with the buffer constraints. As disclosed elsewhere herein, this can occur for a given window and then the window can be advanced, for example by one frame before the next iteration.

Encoder component 390 can receive the decoded content stream from decoder component 380 and transcoding control information passed by SWBC 360 to encode output content stream 304. Output content stream 304 can be a transcode of input content stream 302.

Figure 6:
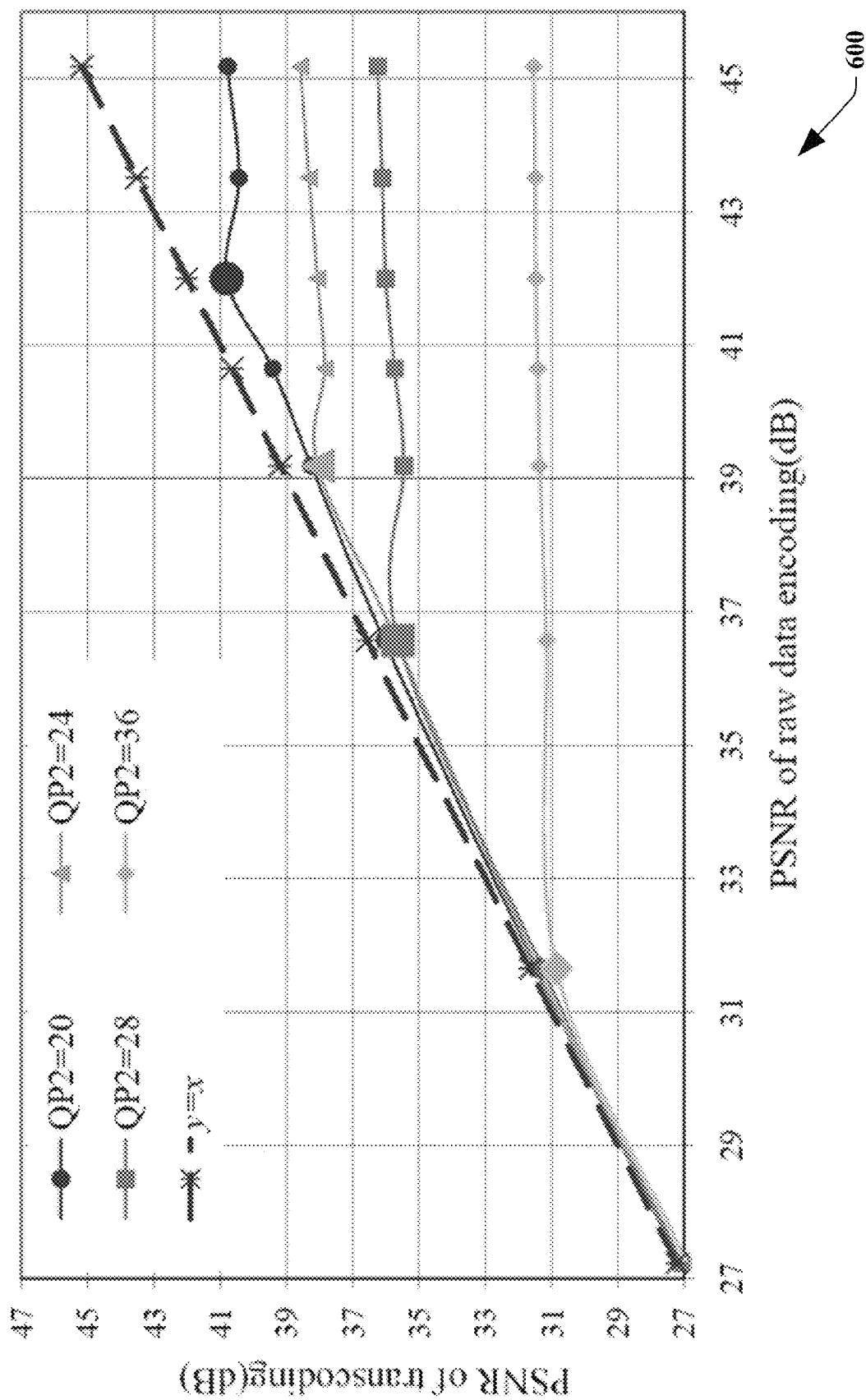
FIG. 6 illustrates results of an exemplary modeling of peak signal to noise ratio for content transcoding in accordance with an aspect of the disclosed subject matter.
Figure 7:
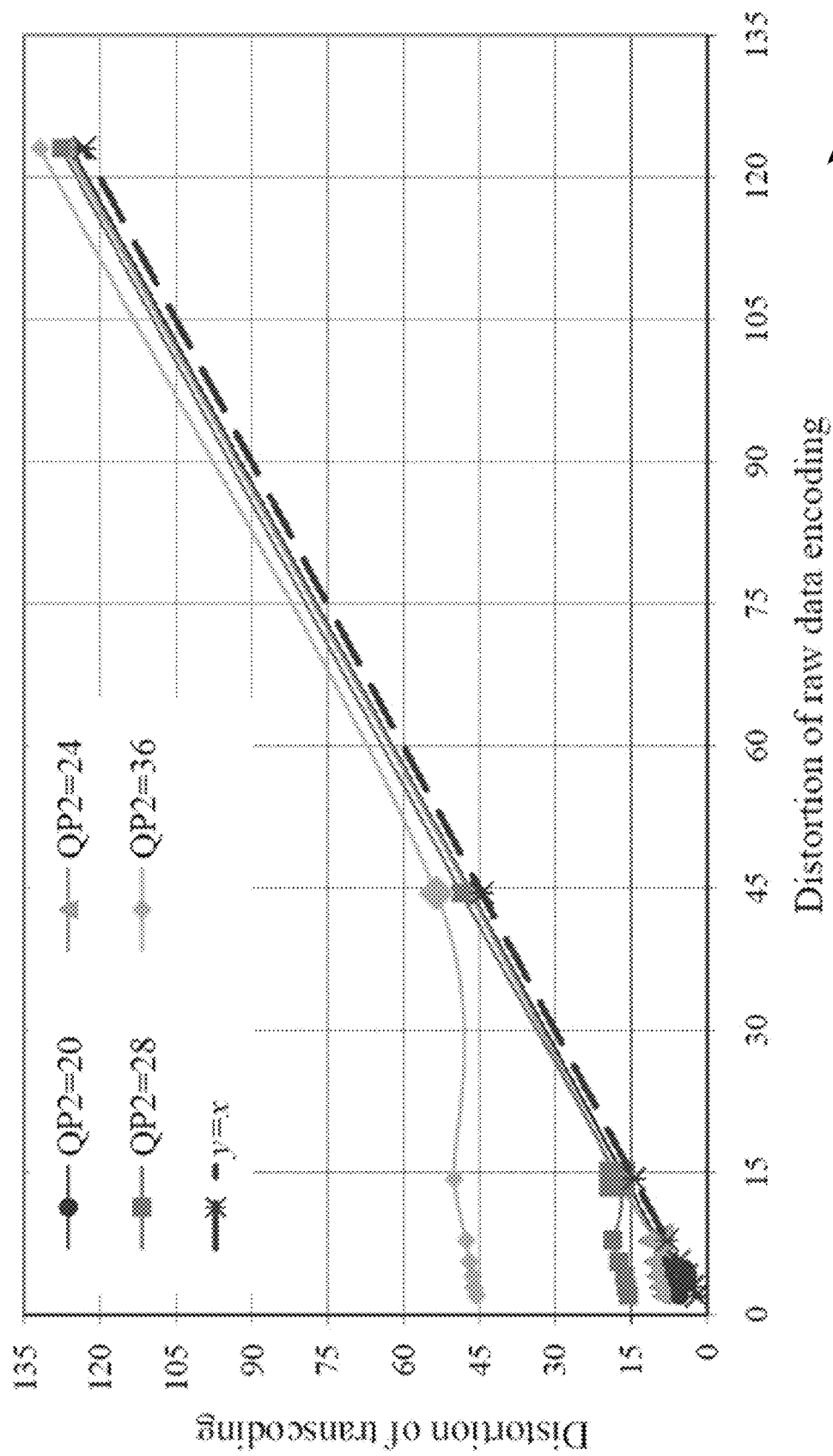
FIG. 7 illustrates results of an exemplary modeling of distortion for content transcoding in accordance with an aspect of the disclosed subject matter.

Returning now to a more theoretical discussion of R-D modeling, to investigate the quantization effect of encoding on transcoding, an exemplary set of encodings are firstly implemented on a raw content sequence such as the exemplary "Foreman" (CIF) video sequence using constant quantization parameters ranging, for example using eight QPs from 16 to 44 $\{Q_1=16, 18, 20, 22, 24, 28, 36, 44\}$. From these, a set of bit rate values, e.g., eight bit rate values, $\{R_1(Q_1)\}$ and a set of distortion values, e.g., eight distortion values, $\{D_1(Q_1)\}$ can be recorded for the raw content encoding respectively. Transcoding can subsequently be performed on the encoded bit streams using a second set of quantization parameters, $Q_2$, such as $\{Q_2=20, 24, 28, 36\}$. As such, a set of bit rate values and distortion values, e.g., eight bit rate values $\{R_2(Q_1, Q_2)\}$ and eight distortion values $\{D_2(Q_1, Q_2)\}$ can be recorded for each $Q_2$ respectively. As an example, the performance of an H.264/AVC cascade transcoder for bit rate adaption compared to that of a standard H.264/AVC encoder is depicted in FIGS. 4, 6, and 7.

Figure 4:
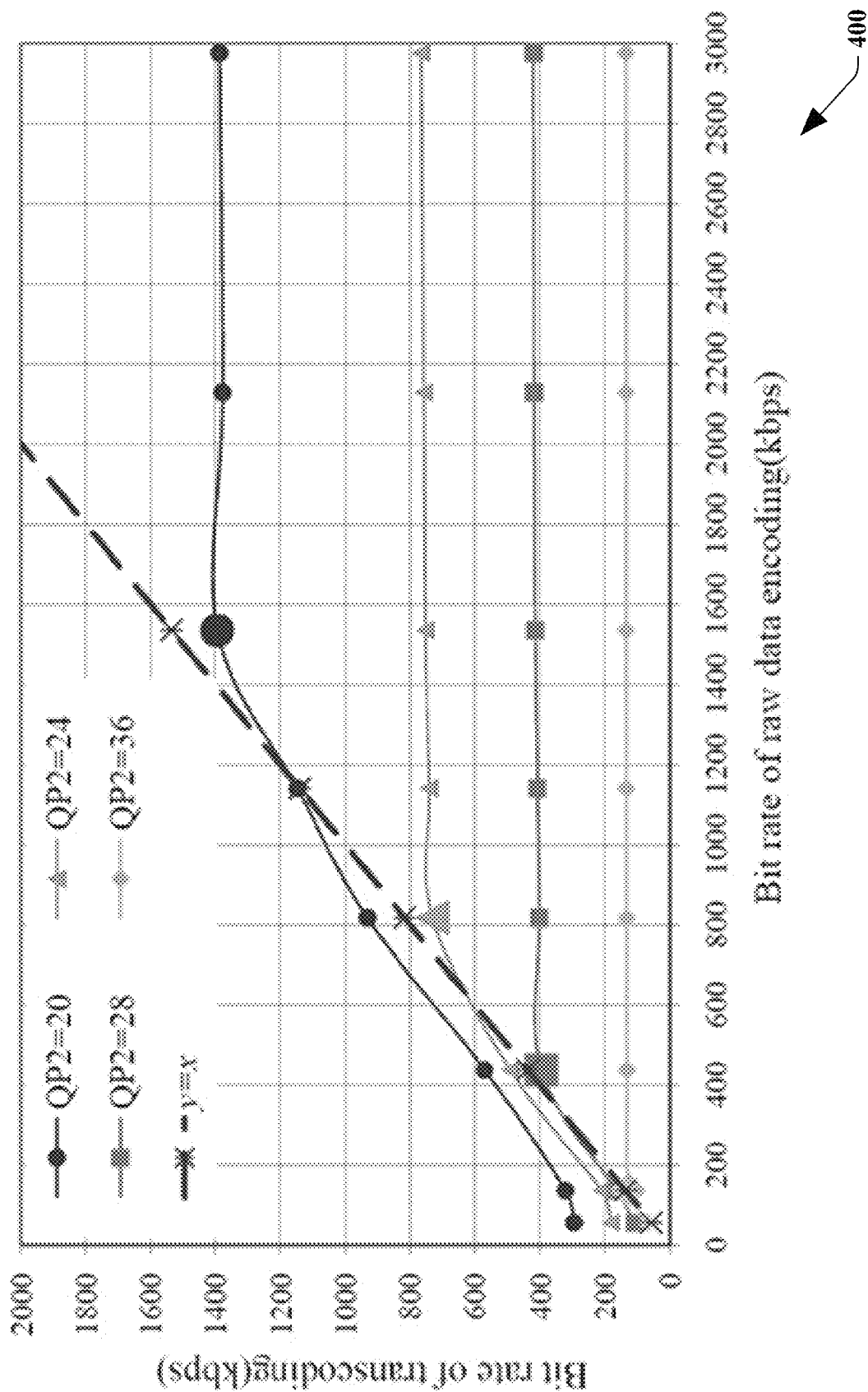
FIG. 4 illustrates results of an exemplary modeling of bitrate for content transcoding in accordance with an aspect of the disclosed subject matter.

FIG. 4 illustrates results 400 of an exemplary modeling of bitrate for content transcoding in accordance with an aspect of the disclosed subject matter. In FIG. 4, $\{R_2(Q_1, Q_2)\}$ is drawn along $\{R_1(Q_1)\}$ for each $Q_2$, where the horizontal axis is the bit rate of raw video encoding, represented by $R_1(Q_1)$, and the vertical axis is the bit rate of transcoding, represented by $R_2(Q_1, Q_2)$. From FIG. 4, it can be deduced that $R_2(Q_1,Q_2)$ remains almost the same when $Q_2$ is larger than $Q_1$, and it reduces dramatically when $Q_1$ is larger than $Q_2$. It can similarly be deduced that as $Q_1$ becomes larger than $Q_2$, $R_2(Q_1,Q_2)$ is larger than $R_1(Q_2)$. With regard to quantization, $R_2(Q_1,Q_2)$ should theoretically be equal to $R_1(Q_1)$ when $Q_2$ equals $Q_1$, which is quantized twice with the same QP. However, $R_2(Q_1,Q_2)$ is slightly less than $R_1(Q_2)$ when $Q_1$ equals $Q_2$, because macroblocks (MBs) may select different motion vectors (MVs) than the previous ones during transcoding. In FIG. 4, for reference, the curve of "y=x" is also plotted, illustrating a slope of 1. A slope of 1 would indicate that the bit rate of transcoding is the same as the bitrate of encoding the raw content data. Thus, $R_2(Q_1,Q_2)$ above "y=x" indicates that the bit rate of transcoding is larger than that of raw video data encoding, and $R_2(Q_1,Q_2)$ below "y=x" indicates that the bit rate of transcoding is lower than that of raw video data encoding.

Figure 5:
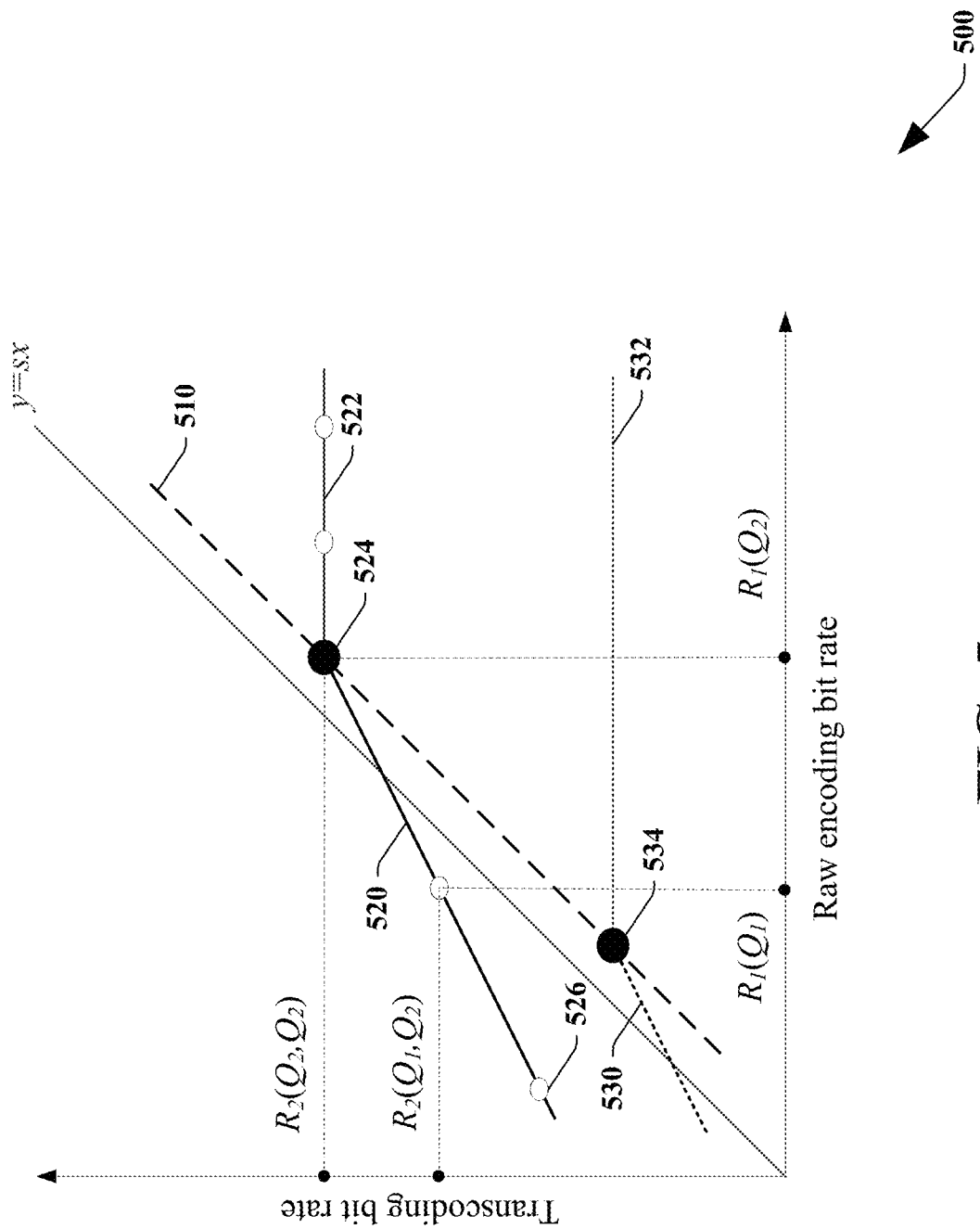
FIG. 5 illustrates model bitrate characteristics for exemplary content transcoding in accordance with an aspect of the disclosed subject matter.

FIG. 5 illustrates model bitrate characteristics 500 for exemplary content transcoding in accordance with an aspect of the disclosed subject matter. Based on the observations from FIG. 4, idealized rate characteristics can be drawn, such as those depicted in FIG. 5, where the bit rate curves display a "knee" along line 510. It will be readily appreciated that line 510 has the same slope as the line "y=sx", and as such, the line 510 can be determined to have the equation y=sx, for s<1. The knee in the bit rate curves, e.g., 524 and 534, separate the curves into a lower portion, e.g., 520 and 530 respectively, and an upper portion, e.g., 522 and 532 respectively. Thus, the rate model of transcoding can be approximated as $$R_2(Q_1, Q_2) = \begin{cases} s \times R_1(Q_2) & Q_2 \geq Q_1 \\ r \times R_1(Q_1) + (s-r) \times R_1(Q_2) & Q_2 < Q_1 \end{cases} \quad (1)$$

where $R_1(Q_1) = \alpha \times Q_1^{-\alpha}$ is under the assumption of Cauchy distribution of quantized discrete cosine transform (DCT) coefficients. The derivation of the bottom formula in (1) is as follows. Given the slope r and the coordinate of a point $A(x_A, y_A)$ and a point $B(x_B, y_B)$, for example letting point 524 be point A and point 526 be point B, the straight line across A and B can be equalized as $$y(A,B) = r(x - x_A) + y_A \quad (2)$$

If we let the coordinate of A be the same as point 524 in FIG. 5, e.g., $(R_1(Q_2), s \times R_1(Q_2))$, then Eq. (2) can be also written as $$\begin{aligned} y(A, B) &= r \times x + (y_A - rx_A) \\ &= r \times x + (s \times R_1(Q_2) - r \times R_1(Q_2)) \\ &= r \times x + (s - r) \times R_1(Q_2) \end{aligned} \quad (3)$$

The parameters s represents the slope of line 510 passing through the knee points of the curves plotted in FIG. 5, and r represent the slope of the portions of the plotted curves on the left side of the "knee line" 510, e.g., 520 and 530. It can be seen that the bits cost of encoding should be theoretically determined by the larger one of $Q_1$ and $Q_2$ in transcoding. Thus, the encoding bits would approach 0 if $Q_1$ becomes infinite, as illustrated by curve 710 in FIG. 5 would cross (0, 0), so the slope s can be calculated by $R_2(Q_2, Q_2)/R_1(Q_2)$. Usually, s is less than 1 because $R_2(Q_1,Q_2) < R_1(Q_1)$ when $Q_2=Q_1$ as stated above. The parameter s can be somewhat different for different transcoding, which can be determined by off-line experiments and updated dynamically during transcoding using statistics of the actual bits usage. In addition, it can also be observed that r is less than s from FIG. 5. Thus, it can be concluded that and r are subject to r<s<1 in Eq. (1) for bit rate adaption of the exemplary H.264/AVC transcoding plotted. In actuality, such a conclusion can be drawn for any other content coding standard with respect to transcoding for bit rate adaption as presently disclosed.

FIGS. 6 and 7 illustrate additional characteristics of the exemplary H.264/AVC transcoding associated with FIG. 4. FIG. 6 illustrates results 600 of an exemplary modeling of peak signal to noise ratio (PSNR) for content transcoding in accordance with an aspect of the disclosed subject matter. FIG. 7 illustrates results 700 of an exemplary modeling of distortion for content transcoding in accordance with an aspect of the disclosed subject matter. Distortion is measured in mean squared error (MSE). In FIG. 7, $\{D_2(Q_1, Q_2)\}$ is drawn along $\{D_1(Q_1)\}$ for each $Q_2$. As illustrated, all curves of $\{D_2(Q_1, Q_2)\}$ are above "y=x", which is indicative of the distortion of transcoding always being larger than that of encoding. This characteristic can be demonstrated by looking at FIG. 8.

Figure 8:
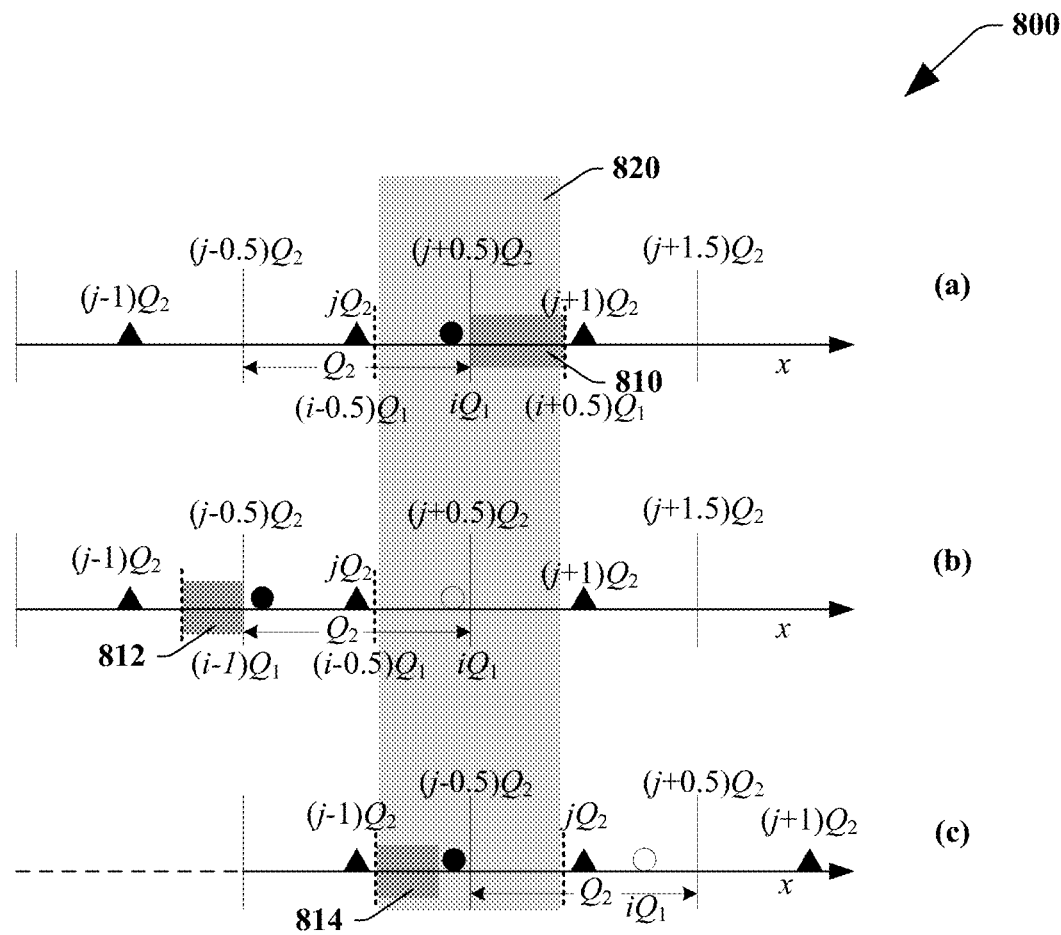
FIG. 8 depicts aspects of discrete cosine transform coefficients for content transcoding in accordance with an aspect of the disclosed subject matter.

FIG. 8 depicts aspects of discrete cosine transform coefficients 800 for content transcoding in accordance with an aspect of the disclosed subject matter. In FIG. 8, the DCT coefficients are arranged along the horizontal axis according to their amplitudes. The shaded DCT coefficients 810 in FIG. 8(a) are in $[(j+0.5)Q_2, (j+1.5)Q_2]$, so they are quantized to $(j+1)Q_2$ by one-pass quantization of general content encoding. However, they are also quantized to $jQ_2$ during transcoding, because they are firstly quantized to $iQ_1$ by $Q_1$ during encoding, and then are further quantized to $jQ_2$ ($iQ_1 \in [(j-0.5)Q_2, (j+0.5)Q_2]$) by $Q_2$ during transcoding. A similar situation also occurs for FIG. 8(b) with the shaded DCT coefficients 812. By transiting FIG. 8(b) horizontally, FIG. 8(c) can be arrived at. The combination of FIG. 8(a) and FIG. 8(c) would form a new shaded region 820, where the DCT coefficients are quantized to two different values by one-pass quantization and transcoding quantization. If it is assumed that the QP of encoding on raw video source is $Q_1$ and the QP of transcoding on decompressed video source is $Q_2$, the distortion of encoding by $Q_1$ can be calculated by $$D(Q_1) = \sum_{j=-\infty}^{+\infty} \int_{(j-0.5)Q_1}^{(j+0.5)Q_1} (y - jQ_1)^2 p(y) dy, \quad (4)$$

where y is the DCT coefficient and p(y) represents the probability distribution function of y. If the $Q_2$ quantization is further performed on the results of $Q_1$ quantization of encoding, the distortion from $Q_1$ followed by $Q_2$ can be found by $$D_{Q_1}(Q_2) = \sum_{j=-\infty}^{+\infty} \sum_{\substack{iQ_1 < (j+0.5)Q_2 \\ (j-0.5)Q_2 \leq iQ_1}} \int_{(i-0.5)Q_1}^{(i+0.5)Q_1} (y - jQ_2)^2 p(y) dy. \quad (5)$$

The difference between these two quantizations, $Q_1$ and $Q_2$, can be derived analytically as $$\begin{aligned} D_{Q_1}(Q_2) - D(Q_2) &= \sum_{j=-\infty}^{+\infty} \sum_{\substack{iQ_1 < (j+0.5)Q_2 \\ (j-0.5)Q_2 \leq iQ_1}} \int_{(i-0.5)Q_1}^{(i+0.5)Q_1} (y - jQ_2)^2 p(y) dy - \\ &\quad \sum_{j=-\infty}^{+\infty} \int_{(j-0.5)Q_2}^{(j+0.5)Q_2} (y - jQ_2)^2 p(y) dy \\ &= \sum_{j=-\infty}^{+\infty} \left\{ \int_{(j+0.5)Q_2}^{(i+0.5)Q_1} \left[ \begin{array}{l} (y - jQ_2)^2 - \\ (y - (j+1)Q_2)^2 \end{array} \right] p(y) dy + \right. \\ &\quad \left. \int_{(i-0.5)Q_1}^{(j-0.5)Q_2} \left[ \begin{array}{l} (y - jQ_2)^2 - \\ (y - (j-1)Q_2)^2 \end{array} \right] p(y) dy \right\} \end{aligned} \quad (6)$$

-continued $$= \sum_{j=-\infty}^{+\infty} \left\{ \begin{array}{l} \int_{(j+0.5)Q_2}^{(i+0.5)Q_1} \left[ \begin{array}{c} (2Q_2 y - \\ (2j+1)Q_2^2 \end{array} \right] p(y) dy + \\ \int_{(i-0.5)Q_1}^{(j-0.5)Q_2} \left[ \begin{array}{c} (2j-1)Q_2^2 - \\ 2Q_2 y \end{array} \right] p(y) dy \end{array} \right\}$$

$$= e_1(y) + e_2(y)$$

where $D(Q_2)$ denotes the distortion of one-pass quantization by $Q_2$ for general encoding on a raw content source. This can be put in the form of Eq. (4) by replacing $Q_1$ with $Q_2$. Further, by replacing y in $e_1(y)$ and $e_2(y)$ with $(j+0.5)Q_2$ and $(j-0.5)Q_2$ respectively, both $e_1(y)$ and $e_2(y)$ can be proved positive by $$e_1(y) = \sum_{j=-\infty}^{+\infty} \int_{(j+0.5)Q_2}^{(i+0.5)Q_1} \left[ \begin{array}{c} (2Q_2 y - \\ (2j+1)Q_2^2 \end{array} \right] p(y) dy > \quad (7)$$

$$\sum_{j=-\infty}^{+\infty} \int_{(j+0.5)Q_2}^{(i+0.5)Q_1} \left[ \begin{array}{c} (2Q_2(j+0.5)Q_2 - \\ (2j+1)Q_2^2 \end{array} \right] p(y) dy$$

$$= \sum_{j=-\infty}^{+\infty} \int_{(j+0.5)Q_2}^{(i+0.5)Q_1} \left[ \begin{array}{c} (2jQ_2^2 + Q_2^2 - \\ 2jQ_2^2 - Q_2^2 \end{array} \right] p(y) dy$$

$$= 0$$

and $$e_2(y) = \sum_{j=-\infty}^{+\infty} \int_{(i-0.5)Q_1}^{(j-0.5)Q_2} \left[ \begin{array}{c} (2j-1)Q_2^2 - \\ 2Q_2 y \end{array} \right] p(y) dy > \quad (8)$$

$$\sum_{j=-\infty}^{+\infty} \int_{(i-0.5)Q_1}^{(j-0.5)Q_2} \left[ \begin{array}{c} (2j-1)Q_2^2 - \\ 2Q_2^2(j-0.5) \end{array} \right] p(y) dy$$

$$= \sum_{j=-\infty}^{+\infty} \int_{(i-0.5)Q_1}^{(j-0.5)Q_2} \left[ \begin{array}{c} (2jQ_2^2 - Q_2^2) - \\ 2jQ_2^2 + Q_2^2 \end{array} \right] p(y) dy$$

$$= 0 (y \in [(i-0.5)Q_1, (j-0.5)Q_2))$$

Figure 9:
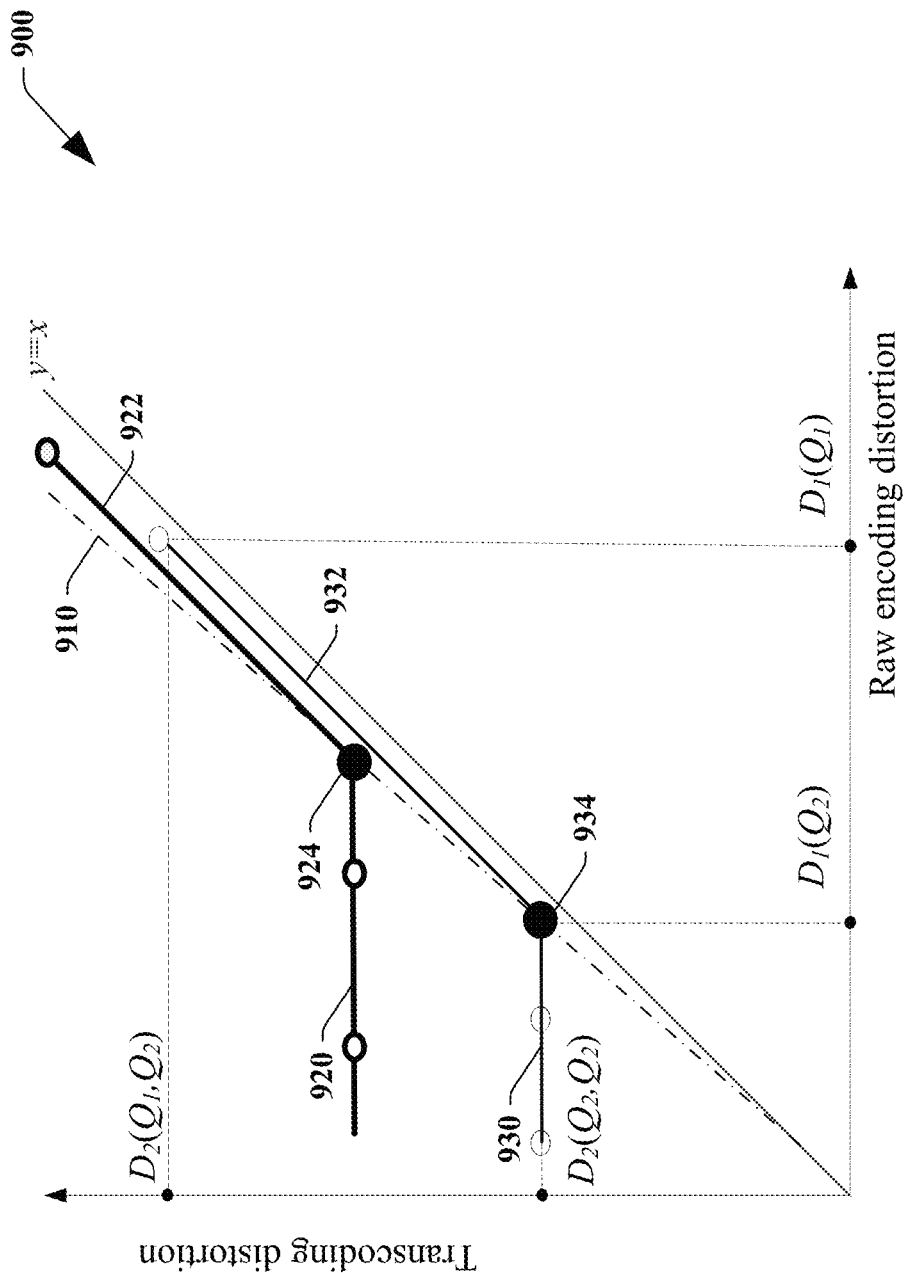
FIG. 9 illustrates model distortion characteristics for exemplary content transcoding in accordance with an aspect of the disclosed subject matter.

As such, it can be concluded that the transcoding distortion is always larger than that of the one-pass quantization on raw video data, i.e., $D_{Q1}(Q_2) - D(Q_2) > 0$. FIG. 9 illustrates model distortion characteristics 900 for exemplary content transcoding in accordance with an aspect of the disclosed subject matter. Based on the observation of FIG. 7 and the conclusion that the distortion of transcoding is always larger than that of encoding, a distortion model of transcoding can be formed in a similar manner to the rate model disclosed hereinabove. Idealized transcoding distortion characteristics with respect to that of raw content data encoding can be represented by FIG. 9, where $D_1(Q_1)$ represents the distortion of raw content data encoding with QP of $Q_1$, and $D_2(Q_1, Q_2)$ represents the distortion of transcoding with QP of $Q_2$ preceded by encoding with QP of $Q_1$. According to Eqs. (6)-(8), $D_2(Q_1, Q_2)$ is larger than $D_1(Q_1)$ for bit rate adaption transcoding, so the curve of $D_2(Q_1, Q_2)$ is above that of $D_1(Q_1)$, as illustrated in FIG. 9. Further, $D_2(Q_1, Q_2)$ parallels the horizontal axis when $Q_1$ is less than $Q_2$ which indicates that transcoding distortion is governed by $Q_2$ as $Q_1 < Q_2$, and $D_2(Q_1, Q_2)$ starts to increase as $Q_1$ becomes larger than $Q_2$ which indicates transcoding distortion is related to $Q_1$ as $Q_1 > Q_2$. Therefore, the distortion model of transcoding can be approximated as $$D_2(Q_1, Q_2) = \begin{cases} u \times D_1(Q_2) & Q_2 \geq Q_1 \\ v \times D_1(Q_1) + (u-v) \times D_1(Q_2) & Q_2 < Q_1 \end{cases} \quad (9)$$

where $D_1(Q_1) = b \times Q_1^\beta$ (b, $\beta > 0$) conforms with the assumption of Cauchy distribution of quantized DCT coefficients. The parameters u and v in Eq. (9) are subject to u>1 and v<u from the analysis of experimental statistics illustrated in FIG. 7.

From Eqs. (1) and (9), the output bit rate and distortion of transcoding are decided by both QPs of encoding and transcoding. It will be noted, that while the models of Eqs. (1) and (9) are derived from the characteristics of transcoding of bit rate adaption for H.264/AVC, the same, or similar, equations would result from derivations of other types of transcoding, such as format conversion among H.264/AVC, MPEG-2 and AVS-P2. As such, the disclosure herein can be said to demonstrate R-D models in a form of two-parameter formula. All such two-parameter R-D model formulas are thus within the present scope of disclosure.

Window-Level Rate Control for Content Transcoding

Many conventional rate control algorithms for transcoding are based on one-pass encoding algorithms. These algorithms typically make only limited use of pre-encoding statistic information. For example, although the bits consumption of pre-encoding is used in bit allocation for transcoding, such a usage does not make full use of the pre-encoding information to provide smooth visual quality. A two-pass rate control algorithm, in contrast to a one-pass, is generally regarded as being the most efficient for smooth visual quality.

A two-pass rate control algorithm can be adapted to perform at a window basic unit, a group of successive frames (GOPs). Further, buffer constraint compliance can be addressed by employing a sliding window buffer check (SWBC) strategy. SWBC is described in more detail herein and aspects are also disclosed in "Method and apparatus for two-pass video signal encoding using a sliding window of pictures," European Patent Office, EP2200320, which is hereby incorporated by reference in its entirety. As such, a window-level rate control algorithm can be deployed for both smooth visual quality and compliant buffer constraint. In a conventional two-pass rate control algorithm, the first-pass encoding can yield the statistics of the entire frame sequence for all of the content. These statistics can include bits usage profile, scene change, and QPs. Furthermore, the second-pass encoding n a conventional two-pass rate control algorithm typically reallocates target bits among different scenes to achieve smooth visual quality by $$R_{2,n} = k(Q_{1,n})^p \quad (10)$$

where $R_{2,n}$ is the amount of reallocated bits of scene n for the second-pass encoding, $Q_{1,n}$ is the quantization step size of the first-pass encoding, k is the model parameter and p is the scene-dependent factor. Eq. (10) can be rewritten into $b_{2,i} = k b_{1,i}(Q)^p$ at a frame level, where $b_{1,i}$ and $b_{2,i}$ are the number of bits of the first-pass and second-pass for frame i, respectively. Thus, $\{b_{1,i}\}$ and $\{Q_{1,i}\}$ (i=0, 1, ..., N-1) can be given by the first-pass encoding. One aspect of two-pass rate control results from the fact that there is a high correlation between bit rate profile of constant bit rate (CBR) encoding and QP profile of variable bit rate (VBR) encoding. In an aspect, the first-pass encoding employs CBR rate control, such as JVT-H017r3 for H.264/AVC while the second-pass encoding computes a new set of QPs based on the bits and QP profiles of the first-pass encoding.

In many of content coding applications, real-time requirements and smooth visual quality are both desired. Real-time content coding applications, such as video streaming, usually work on a constant bit rate (CBR) channel. Thus, a CBR rate control algorithm is commonly preferred for those applications. However, there is often a significant picture quality fluctuation for CBR algorithms. To obtain smoother visual quality, VBR algorithms designed for off-line encoding without real time and buffer constraints are often preferred. In contrast to conventional two-pass rate control algorithms, to obtain smooth visual quality in real time encoding while conforming to a buffer constraint, a window-level rate control algorithm (WRC) can be employed. WRC can demonstrate the advantages of two-pass rate control models for smooth visual quality and can employ SWBC for buffer control. In WRC, the conventional two-pass rate control algorithm can be adapted to be operated at a window basic unit instead of the entire content sequence. Furthermore, WRC can employ other buffer control schemes and, in at least one aspect, can be employed without a buffer control scheme. A window basic unit can be a subset of the content, for example, a set of frames. Thus, rather than applying a two-pass rate control algorithm to an entire content sequence, WRC can apply two-pass rate control algorithm to subsets of the content sequence in a manner that is buffer constrained. This can facilitate the application of two-pass rate control algorithm to real-time transcoding while still resulting in acceptable visual quality in contrast to conventional two-pass rate control algorithms that typically generate acceptable visual quality only when run off line.

WRC window size can be determined from buffer constraints. As an example, in H.264/AVC, a hypothetical reference decoder (HRD) is used to address buffer constraints. In HRD theory, the end-to-end delay includes initial decoder delay ($T_d$) and initial encoder delay ($T_e$). $T_d$ represents the minimum time that a decoder should wait for the incoming bit stream before it starts to decode, allowing sufficient time for bits to begin filling the buffer. A decoder can underflow without $T_d$ because a certain period of time is needed to receive the encoded bits over a limited bandwidth channel. Correspondingly, $T_e$ represents the time-delay of the encoded bits entering into communication channel after they are generated. In HRD theory, frames are assumed to be encoded at a uniform time step, which implies that the i-th frame is encoded at $T_e + i \times (1/F_r)$ given the initial encoder delay $T_e$ and a frame rate, $F_r$. For WRC, assuming that a window consists of multiple content frames, $T_e \times F_r$ frames. To facilitate real-time transcoding, the last frame (indexed by $T_e \times F_r - 1$) of the window would be encoded at $(T_e \times F_r - 1) \times (1/F_r) = T_e - (1/F_r)$ which should be before the first frame of the window enters the communication channel, which corresponds to the frames of the window being encoded within time period $T_e$. Thus, a window size of $N = T_e \times F_r$ frames can be processed in the manner of two-pass rate control algorithm in real-time while still yielding the smooth visual quality commonly associated with more conventional two-pass rate control algorithms. In WRC, the real-time processing aspect is not compromised because there is no additional time delay introduced by utilizing the inherent delay $T_e$ of a streaming system. Of note, window size can also consider computing power in real-time encoding because computing power can be correlated to processing the window basic unit in a timely manner. Fortunately, for transcoding, the frame bits and QP usages can be easily obtained for the entire content sequence at negligible computational cost by parsing the input bit stream. As such, the window basic unit size is most strongly correlated with buffer constraints in WRC transcoding.

In addition, WRC can also benefit from including buffer control for its applications in real-time video encoding and transcoding. Traditional buffer control strategy checks the buffer status at the frame level as $$B_e(j-1) + \left(b(j) - \frac{R}{f}\right) < B \qquad (11)$$

where $B_e(j)$ is the buffer fullness of the j-th frame, b(j) represents the number of bits of the j-th frame, R is channel bandwidth and f is frame rate. Conventionally, where the buffer constraint is violated, QP will be updated immediately in the next frame. This can result in visual quality fluctuations. Whereas the bits usage of the entire sequence, not just the window basic unit, is available for WRC transcoding, a buffer control strategy can be based on the window basic unit. WRC related buffer control strategies can include SWBC. SWBC can be employed in WRC by checking buffer status at window basic unit as $$\sum_{i=j-N}^{j-1} \max\left(0, b(i) - \frac{R}{f}\right) + b(j) < B \qquad (12)$$

where "max" is due to constraints of HRD, N is the window size and B is the given buffer size. In SWBC, the QPs of a window of frames are adjusted if the buffer overflows. Further, in SWBC, the window advances, e.g., slides forward one frame, each time the buffer status is examined, so that SWBC is compatible with the traditional buffer measurement at frame level. This process is performed after gathering the frame bits usage of the encoded bit stream followed by the transcoding process. Moreover, the buffer status is updated with the actual number of coding bits during transcoding. Thus, the QPs of a window of frames are obtained smoothly and the output bit stream can be well controlled under buffer constraint.

FIGS. 10-13 illustrate methods and/or flow diagrams in accordance with the disclosed subject matter. For simplicity of explanation, the methods are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states by way of state diagram or events. Additionally, it should be further appreciated that the methods disclosed hereinafter and throughout this specification are capable of being stored on an article of manufacture to facilitate transporting and transferring such methods to computers. The term article of manufacture, as used herein, can encompass a computer program accessible from any computer-readable device, carrier, or media.

Figure 10:
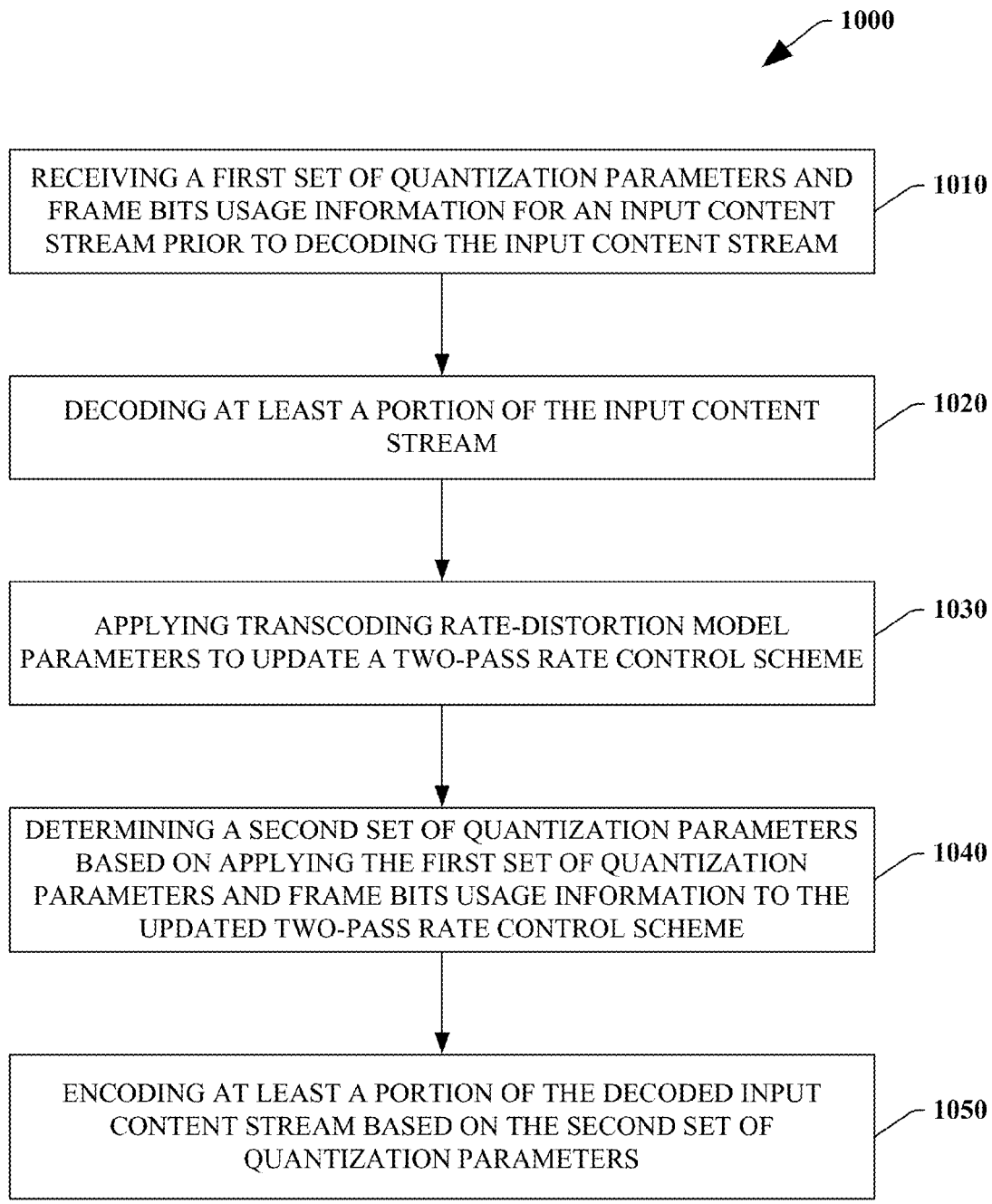
FIG. 10 illustrates a method that facilitates content transcoding in accordance with an aspect of the disclosed subject matter.

FIG. 10 illustrates a method 1000 that facilitates content transcoding in accordance with an aspect of the disclosed subject matter. At 1010 a first set of quantization parameters (QPs) and frame bits usage information can be received for an input content stream. The first set of QPs and frame bits usage information can be for an input content stream prior to decoding of the input content stream for transcoding. In an aspect, the first set of QPs and frame bits usage information can relate to the encoding of the input content stream prior to transcoding. For example, where an MPEG2 input stream is to be transcoded to an MPEG4 output stream, the first set of QPs and frame bits usage information can be related to the MPEG2 coding before decoding and recoding to MPEG4 occurs. In an aspect, the first set of QPs and frame bits usage information can be determined from parsing the input content stream.

At 1020, at least a portion of the input content stream can be decoded. The decoding at 1020 can be in preparation for encoding as part of a transcoding process. At 1030, a transcoding rate-distortion model can be employed to determine parameters which can be applied to update a two-pass rate control scheme. The transcoding rate-distortion model can correlate a first set of QPs and frame bits usage information to a second set of QPs and frame bits usage information based on performance characteristics of the transcoding process. The transcoding rate-distortion model can be applied to nearly any transcoding scheme. At 1040, a second set of QPs and frame bits usage information can be determined by applying the first set of QPs and frame bits usage information to the updated update a two-pass rate control scheme. As such, the second set of QPs and frame bits usage information can be related to the QPs and frame bits usage information of the input content stream from 1010.

At 1050, at least a portion of the decoded input content stream can be encoded. At this point method 1000 can end. In an aspect, the encoding at 1050 can be considered a re-encoding of previously encoded raw content, e.g., raw content is encoded, then decoded, then re-encoded. The encoding at 1050 can be based on the second set of QPs and frame bits usage information. In an aspect, the encoding can encode the decoded input content stream from 1020 with different encoding that the input content stream associated with 1010. It will be noted that the transcoding of method 1000 is based on the quantization of both the encoding of the input content stream, e.g., at 1010, and the transcoding of the output content stream, e.g., at 1050.

Figure 11:
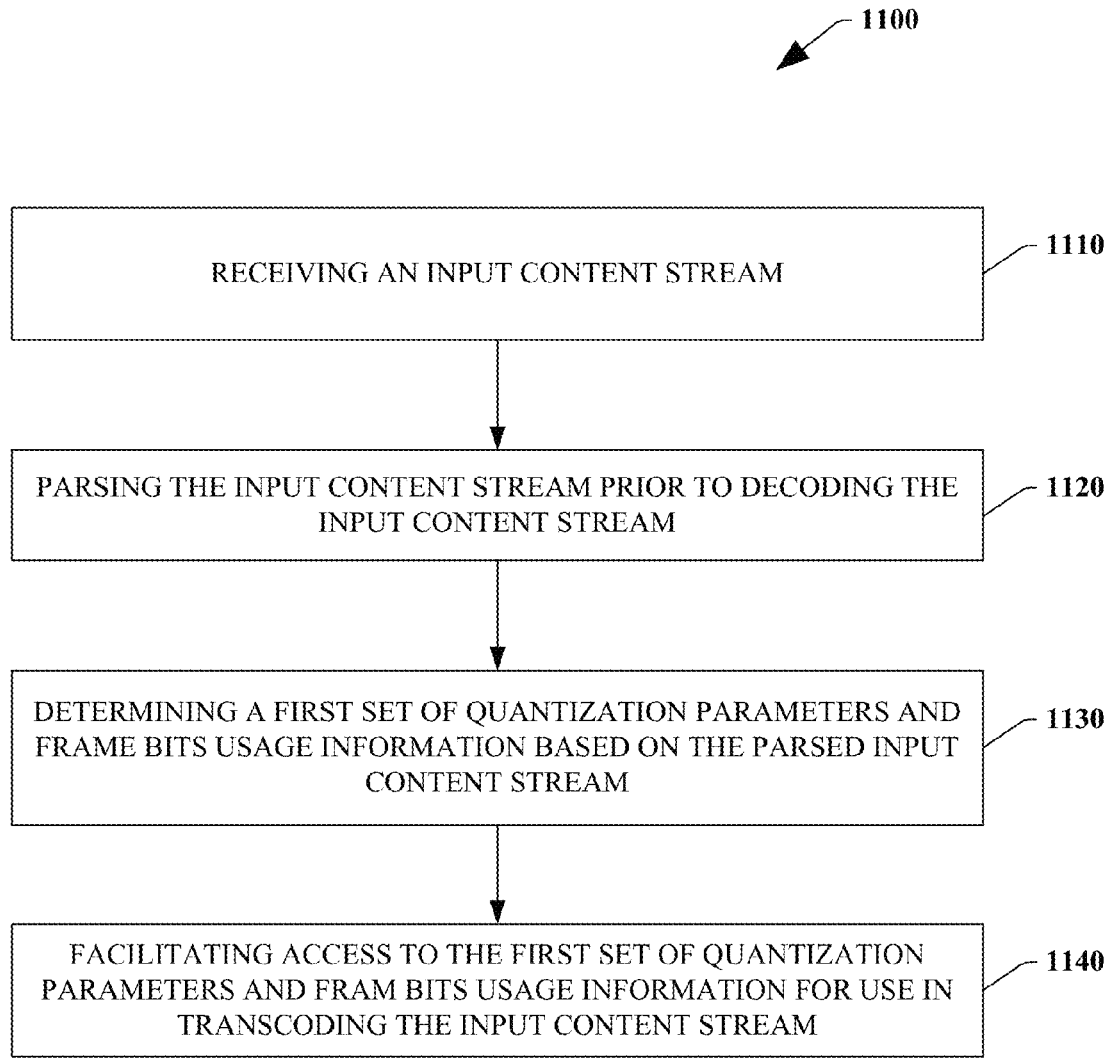
FIG. 11 illustrates a method that facilitates access to quantization parameters for an input content stream in accordance with an aspect of the disclosed subject matter.

FIG. 11 illustrates a method 1100 that facilitates access to quantization parameters and frame bits usage information for an input content stream in accordance with an aspect of the disclosed subject matter. At 1110, an input content stream can be received. At 1120 the input content stream can be parsed prior to, or at least independent of, decoding the input content stream. At 1130, a first set of QPs and frame bits usage information can be determined for the input content stream. The determination can be based on the parsed input content stream. At 1140, the first set of QPs and frame bits usage information can be made accessible. As such, the QPs and frame bits usage information can be facilitate transcoding the input content stream. At this point method 1100 can end. In an aspect, the determination of QPs and frame bits usage information relating to the encoding of an input content stream by parsing an input content stream prior to decoding the stream for transcoding can be the same as, or similar to, aspects of 1010 in method 1000.

Figure 12:
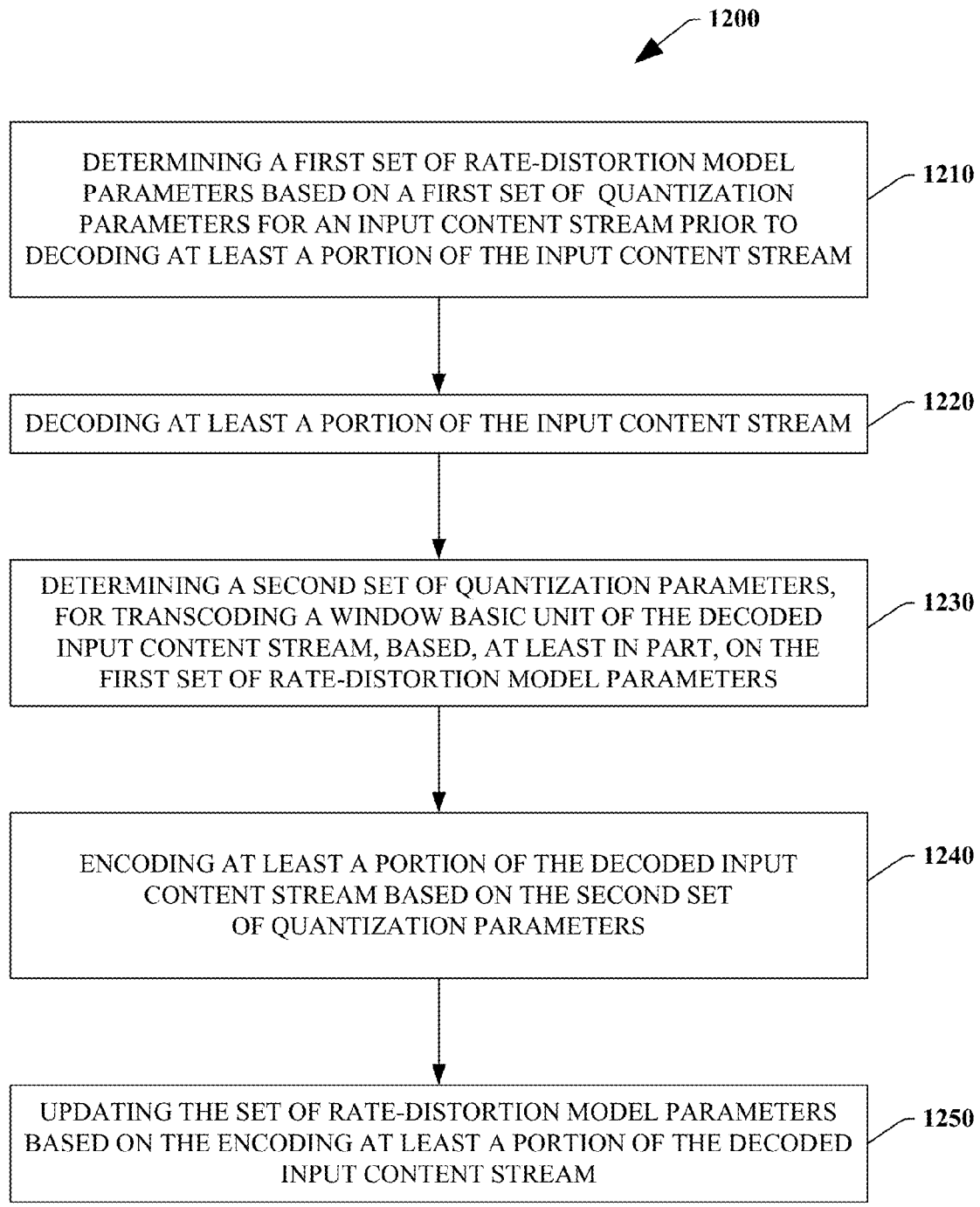
FIG. 12 illustrates a method that facilitates window-level rate control for content transcoding in accordance with an aspect of the disclosed subject matter.

FIG. 12 illustrates a method 1200 that facilitates window-level rate control for content transcoding in accordance with an aspect of the disclosed subject matter. At 1210, a first set of R-D model parameters can be determined. This first set of R-D model parameters can be based on a first set of QPs for an input content stream. As such, the first set of QPs can be viewed as 'initial encoding QPs'. In an aspect, the first set of QPs, and hence the first set of R-D model parameters, can be determined from the input content stream prior to the input content stream being decoded as part of a transcoding scheme.

At 1220, at least a portion of the input content stream can be decoded. In an aspect, the decoding of the input content stream can be associated with transcoding the input content stream.

At 1230, a second set QPs can be determined. This second set of QPs can be based on output characteristics of transcoding. The second set of QPs can facilitate determination of rate control features across the sets of raw content encoding QPs. Further, the R-D model parameters can be determined from a window of frames, as disclosed elsewhere herein. The window of frames will typically be a subset of the decoded content stream. The size of the window can be based on buffer constraints.

At 1240, at least a portion of the decoded content stream from 1220 can be encoded. The encoding can be based on the second set of R-D parameters. In an aspect, the encoding at 1240 employs quantization information for the original encoding for the input content stream from 1210 and the quantization information operable to encode the decoded content stream at 1220 into the transcoded output stream of 1240.

At 1250, the set of rate-distortion model parameters can be updated. This update can be based on encoding at least a portion of the decoded input content stream. At this point method 1200 can end. In an aspect, the update can be associated with actual parameters employed in re-encoding decoded content.

Figure 13:
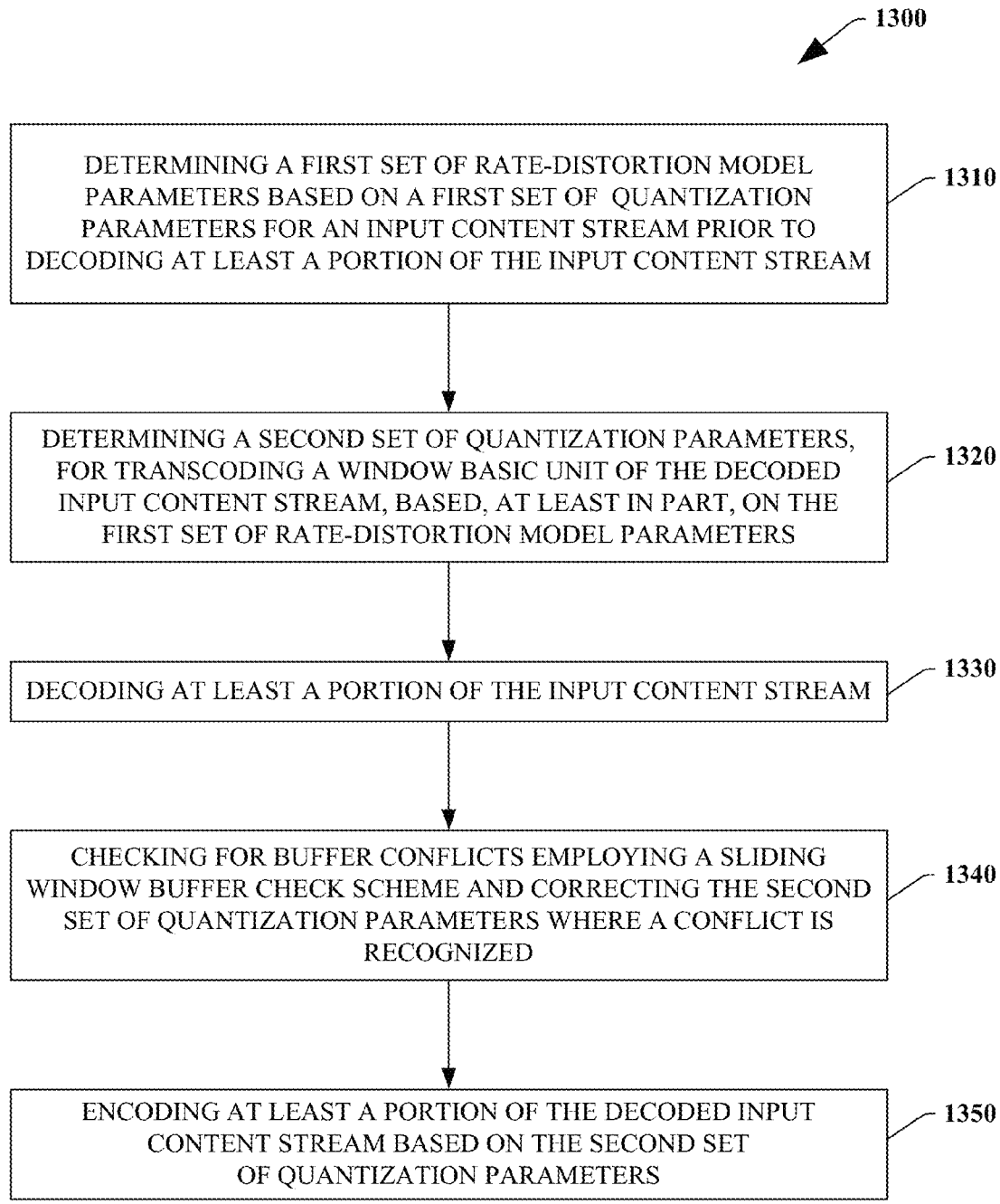
FIG. 13 illustrates a method that facilitates window-level rate control for content transcoding with sliding window buffer check in accordance with an aspect of the disclosed subject matter.

FIG. 13 illustrates a method 1300 that facilitates window-level rate control for content transcoding with sliding window buffer check in accordance with an aspect of the disclosed subject matter. At 1310, a first set of R-D model parameters can be determined. This first set of R-D model parameters can be based on a first set of QPs for an input content stream. In an aspect the first set of QPs, and hence the first set of R-D model parameters, can be determined from the input content stream prior to the input content stream being decoded as part of a transcoding scheme.

At 1320, a second set of QPs can be determined based, at least in part, on the first set of R-D model parameters. The second set of QPs can be related to transcoding the input content stream. Further, the second set of QPs can be determined from a window of frames, as disclosed elsewhere herein. The window of frames will typically be a subset of the decoded content stream and be associated with a window basic unit. The size of the window can be based on buffer constraints.

At 1330, at least a portion of the input content stream can be decoded. In an aspect, the decoding of the input content stream can be associated with transcoding the input content stream.

At 1340, checking for buffer conflicts can occur. The checking can employ a sliding window buffer check SWBC scheme as disclosed elsewhere herein. Further, dynamic adjustment can be made to the second set of QPs where a conflict with buffer constraints is determined. As a non-limiting example, where a buffer overflow condition is determined, the bitrate parameters can be adjusted to reduce the flow of streaming bits into the buffer to correct the overflow condition. An aspect of the SWBC scheme allows the correction to be based on averaging of the corrective factors across a window of frames as disclosed herein.

At 1350, at least a portion of the decoded content stream from 1330 can be encoded. The encoding can be based on the second set of QPs. At this point method 1300 can end.

As discussed herein above, WRC for content transcoding can produce consistent visual quality with buffer compliance for real-time transcoding. While WRC can be employed for general video encoding, this would be expected to consume significant computational power to gather the bits and QP usages from the first-pass encoding. However, the usage of WRC in content transcoding can require significantly less computational power as WRC can easily obtain the bits and QP usages by parsing the encoded input content bit stream. Therefore, in an exemplary embodiment, a real-time VBR transcoder can be achieved by applying WRC to a standard transcoder without significant extra computational complexity. Furthermore, by applying the presently disclosed R-D models, e.g., Eq. (1) and (9), significant bit control errors caused in transcoding by conventional R-D models can be avoided.

By combining the proposed R-D models, the proposed WRC and SWBC, a rate control scheme for real-time content transcoding can be effectively deployed. In this rate control scheme, a window basic size is determined, based on buffer constraints. The bits and QP usages of a window are obtained by parsing an input content bit stream. The reallocation of bits for transcoding is performed to achieve a VBR visual quality, for example, in accordance with Eq. (10). The reallocation of bits, e.g., by Eq. (10), can be implemented iteratively. In each iteration, a new set of QPs and bits usage of frames can be derived from the previous one. The bits quota of each frame can be modulated, e.g., by Eq. (1). A new QP can subsequently be calculated, e.g., by $Q_{2,i} = b_{1,i} Q_{1,i} / b_{2,i}$, for each frame after getting the corresponding bits quota, $b_{2,i}$. The result can be further modulated, e.g., by Eq. (9). An example of this rate control scheme for transcoding is summarized in FIGS. 14-15.

Figure 14:
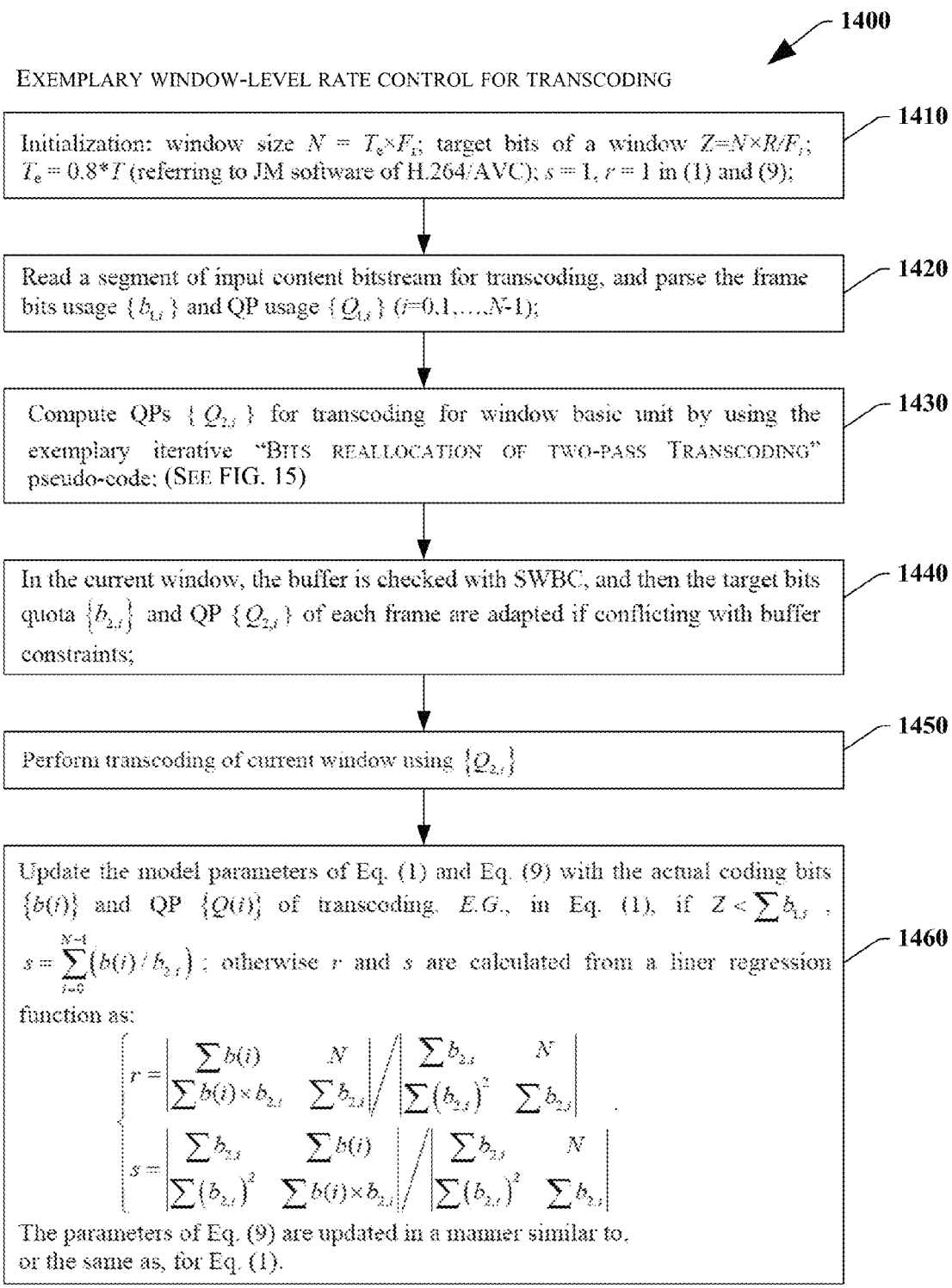
FIG. 14 illustrates exemplary pseudo-code for window-level rate control for content transcoding with sliding window buffer check in accordance with an aspect of the disclosed subject matter.

FIG. 14 illustrates exemplary pseudo-code 1400 for window-level rate control for content transcoding with sliding window buffer check in accordance with an aspect of the disclosed subject matter. At 1410, Pseudo-code 1400 illustrates determining a window basic unit size, N, based on buffer constraints as disclosed hereinabove. Also at 1410, target bits are determined, and the slopes s and r are set to 1 for the R-D model Eqs. (1) and (9).

At 1420, a segment of the input content bit stream for transcoding is read and frames are parsed for bits usage and QP usage. As currently disclosed, the input content can be readily parsed to gather information relevant to the first pass of a two-pass transcoding operation as recited herein above. At 1430, transcoding QPs can be computed for a window basic unit. This can be done iteratively, for examples by employing the pseudo code illustrated at FIG. 15.

At 1440, buffer constraints can be checked. In an aspect the buffer constrains can be checked for the current window. In a further aspect, SWBC can be employed to check buffer constrains. Further at 1440, the target bits quota and transcoding QPs of each frame can be adapted to comply with the buffer constraint.

At 1450, transcoding of the current window can be processed.

At 1460, The R-D model parameters can be updated. In an aspect, the actual coding bits employed in transcoding at 1450 can be applied to the R-D model. For example, Eq. (1) can be updated by applying $$s = \sum_{i=0}^{N-1} (b(i)/b_{2,i}) \text{ if } Z < \sum b_{1,i}$$

and otherwise calculating r and s from a liner regression function as $$\begin{cases} r = \dfrac{\begin{vmatrix} \sum b(i) & N \\ \sum b(i) \times b_{2,i} & \sum b_{2,i} \end{vmatrix}}{\begin{vmatrix} \sum b_{2,i} & N \\ \sum (b_{2,i})^2 & \sum b_{2,i} \end{vmatrix}} \\ s = \dfrac{\begin{vmatrix} \sum b_{2,i} & \sum b(i) \\ \sum (b_{2,i})^2 & \sum b(i) \times b_{2,i} \end{vmatrix}}{\begin{vmatrix} \sum b_{2,i} & N \\ \sum (b_{2,i})^2 & \sum b_{2,i} \end{vmatrix}}, \end{cases}$$

then Eq. (9) can be updated in a similar manner for u and v. The symbols used in the pseudo code depicted in FIGS. 14-15 are summarized in Table 1.

TABLE 1 showing symbols used in the exemplary pseudo code of FIGS. 14-15.

| | |
|---|---|
| N | Window size |
| R, $F_r$ | Target bit rate and frame rate for transcoding |
| Y | Total number of bits of a window in the input bit stream |
| Z | Target bits quota of a window for transcoding |
| i, j | Frame index and iteration index(i = 0, . . . , N − 1, j ≥ 0) |
| $Q_{1,i}$, $b_{1,i}$ | QP and frame bits of the input bit stream |
| $Q_{2,i}^j$, $b_{2,i}^j$ | QP and frame bits of transcoding for the j-th iteration |
| L, U, $L_1$, $U_1$ | The iterative bounds of the algorithm |
| μ, η, k, d | Temporal variables for the iterative algorithm |
| r, s, u, v | Transcoding R-D model parameters in (1) and (9) |
| α, β | Parameters of Cauchy-based rate and distortion models |
| B, T, $T_e$ | Buffer size, buffer delay and initial encoder buffer delay |
| $Q_{2,i}$ | Final QPs of iterative algorithm |

FIG. 15 illustrates exemplary pseudo-code 1500 for bits reallocation with two-pass content transcoding in accordance with an aspect of the disclosed subject matter. Pseudo-code 1500 illustrates iterative determination of transcoding QPs. Pseudo-code 1500 initializes the iterative bounds and sets the transcode frame bits and transcode QPs to the input frame bits and input QPs, e.g., where the input frame bits and input QPs are collected from a parsed input content stream, these values are used as the initial transcode values as well. This effectively causes r, s, u, and v to be 1. Pseudo-code 1500 then iterates through computing and scaling the transcode frame bits and transcode QPs until the target bits quota for a transcode window is transitioned. Pseudo-code 1500 then enters a second iterative phase for reallocation of bits in the transcoding process. The reallocation of bits in exemplary pseudo-code 1500 is constrained to the iterative reallocation of bits of the current window.

Figure 16:
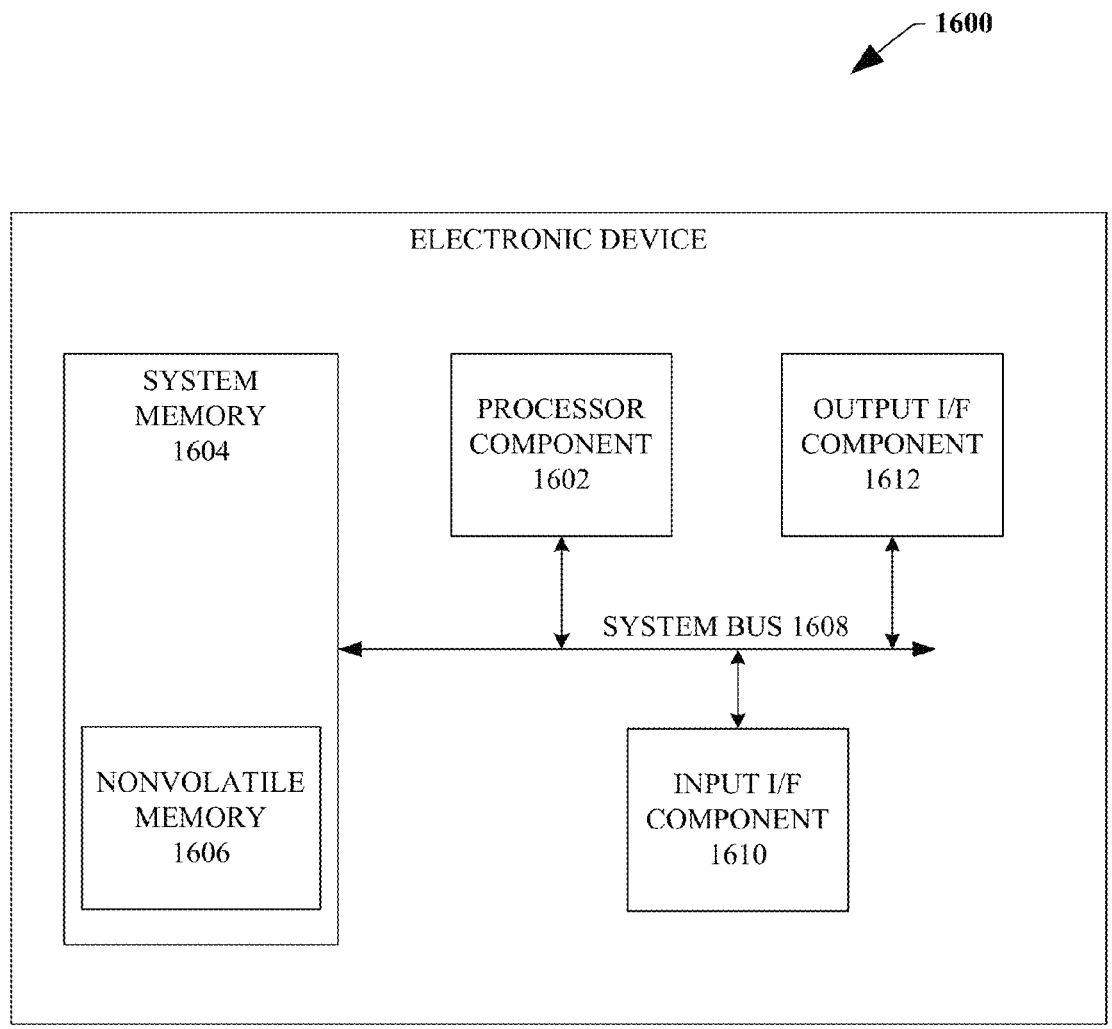
FIG. 16 illustrates a block diagram of an exemplary electronic device that can facilitate content transcoding in accordance with an aspect of the disclosed subject matter.

Referring to FIG. 16, illustrated is a block diagram of an exemplary, non-limiting electronic device 1600 that can facilitate content transcoding in accordance with an aspect of the disclosed subject matter. The electronic device 1600 can include, but is not limited to, a computer, a server, a laptop computer, a server, a dedicated transcoder device, or network equipment (e.g. routers, access points, femtocells, picocells), and the like.

Components of the electronic device 1600 can include, but are not limited to, a processor component 1602, a system memory 1604 (with nonvolatile memory 1606), and a system bus 1608 that can couple various system components including the system memory 1604 to the processor component 1602. The system bus 1608 can be any of various types of bus structures including a memory bus or memory controller, a peripheral bus, or a local bus using any of a variety of bus architectures.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1604 can include computer-readable storage media in the form of volatile and/or nonvolatile memory 1606. A basic input/output system (BIOS), containing the basic routines that help to transfer information between elements within electronic device 1600, such as during start-up, can be stored in memory 1604. Memory 1604 can typically contain data and/or program modules that can be immediately accessible to and/or presently be operated on by processor component 1602. By way of example, and not limitation, system memory 1604 can also include an operating system, application programs, other program modules, and program data. As a further example, system memory can include program modules for subchannel assignment and allocation of power as disclosed hereinabove.

The nonvolatile memory 1606 can be removable or non-removable. For example, the nonvolatile memory 1606 can be in the form of a removable memory card or a USB flash drive. In accordance with one aspect, the nonvolatile memory 1606 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1600 through input devices (not illustrated) such as a keypad, microphone, tablet or touch screen although other input devices can also be utilized. These and other input devices can be connected to the processor component 1602 through input interface component 1610 that can be connected to the system bus 1608. Other interface and bus structures, such as a parallel port, game port or a universal serial bus (USB) can also be utilized. A graphics subsystem (not illustrated) can also be connected to the system bus 1608. A display device (not illustrated) can be also connected to the system bus 1608 via an interface, such as output interface component 1612, which can in turn communicate with video memory. In addition to a display, the electronic device 1600 can also include other peripheral output devices such as speakers (not illustrated), which can be connected through output interface component 1612. In an aspect, other electronic devices, e.g., terminal devices can be communicatively coupled to electronic device 1600 by way of input interface component 1610 and output interface component 1612, which can serve to facilitate transfer of transcoded content streams.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description may have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim. Moreover, the term "or" is intended to be an "inclusive or" and not an "exclusive or", unless otherwise indicated.

What is claimed is:

1. A transcoder system, comprising:
    a decoder that receives an input content stream comprising a first encoding of an external content stream generated by an external encoder, and receives a first set of quantization parameters, wherein the decoder generates a decoded content stream from the input content stream, determines a second set of quantization parameters, and determines a bit usage of the first encoding; and
    an encoder that receives the decoded content stream, initiates a second encoding of the decoded content stream based on the second set of quantization parameters and the bit usage of the first encoding, generates at least one transcoding control value based, at least in part, on a window of frames from the second encoding of the decoded content stream, and generates an output content stream based on the decoded content stream and the transcoding control value.

2. The transcoder system of claim 1, wherein the first set of quantization parameters is related to the first encoding of the input content stream.

3. The transcoder system of claim 1, wherein the bit usage of the first encoding of the input content stream is determined by parsing the input content stream.

4. The transcoder system of claim 1, wherein the first set of quantization parameters is determined from a rate-distortion model based on characteristics of the input content stream.

5. The transcoder system of claim 4, wherein the rate distortion model includes one or more bitrate values.

6. The transcoder system of claim 4, wherein the rate distortion model includes one or more distortion values.

7. The transcoder system of claim 1, wherein the encoder further determines the second set of quantization parameters based, at least in part, on a target bitrate of the output content stream and a rate-distortion model.

8. The transcoder system of claim 1, wherein the window of frames includes a set of frames from the second encoding of the decoded content stream.

9. The transcoder system of claim 1, wherein the encoder further determines satisfying a buffer compliance rule based on at least one buffer constraint.

10. The transcoder system of claim 9, wherein, in response to the buffer compliance rule not being satisfied, the encoder adjusts the at least one transcoding control value.

11. The transcoder system of claim 1, wherein the encoder determines a set of rate-distortion model values based on transcoding the decoded content stream to the output stream.

12. The transcoder system of claim 11, wherein the set of rate-distortion model values includes one or more bitrate values.

13. The transcoder system of claim 11, wherein the set of rate-distortion model values includes one or more distortion values.

14. The transcoder system of claim 1, wherein the at least one transcoding control value is determined from the window of frames comprising a number of frames that enables near real-time encoding of the decoded content stream into the output content stream.

15. The transcoder system of claim 14, wherein the number of frames is adaptable to maintain enablement of the near real-time encoding of the decoded content stream into the output content stream.

16. A method, comprising:
    determining, by a system comprising a processor, a set of rate-distortion model parameters for an externally encoded input content stream;
    decoding the input content stream into a decoded content stream based on a first set of quantization parameters;
    determining a second set of quantization parameters associated with transcoding the decoded content stream, based, at least in part, on the set of rate-distortion model parameters;
    in response to initiating a second encoding of a portion of the decoded content stream into an output stream based on the second set of quantization parameters, determining a transcoding control value for a window of frames from the second encoding of the portion of the decoded content stream; and encoding another portion of the decoded content stream into the output content steam based, at least in part, on the set of quantization parameters and the transcoding control value.

17. The method of claim 16, wherein the determining the second set of rate-distortion model parameters includes parsing the input content stream into a parsed input content stream.

18. The method of claim 17, wherein the determining the set of rate-distortion model parameters includes determining a set of input content stream quantization parameters and frame bits usage information.

19. The method of claim 16, wherein the window of frames comprises frames from the second encoding of the portion of the decoded content stream encompassed by a sliding window having a determined width of frames.

20. The method of claim 19, further comprising, in response to determining a conflict condition of a buffer for a buffer constraint, adjusting the width of the sliding window to encompass a different number of frames therein.

21. A non-transitory computer-readable storage medium having computer-executable instructions that, in response to execution, cause a computing device including a processor to perform operations, comprising:
  receiving an input content stream;
  parsing the input content stream into a parsed input content stream;
  determining a first set of quantization parameters for the input content stream based on the parsed input content stream;
  decoding the input content stream into a decoded content stream;
  accessing a rate-distortion model;
  determining a second set of quantization parameters for transcoding the decoded content stream based on the first set of quantization parameters and the rate-distortion model;
  adapting the second set of quantization parameters based on a transcoding control value determined to satisfy a buffer condition related to a first-pass encoding of the decoded content stream for a window of frames; and
  encoding the decoded content stream into an output content steam based, at least in part on the second set of quantization parameters.

22. A system, comprising:
  a processor; and
  a memory that stores executable instructions that, when executed by the processor, facilitate performance of operations, comprising:
    receiving an input content stream comprising a first encoding of an external content stream generated by an external encoder;
    receiving a first set of quantization parameters;
    generating a decoded content stream from the input content stream;
    determining a second set of quantization parameters;
    determining a bit usage of the first encoding;
    initiating a second encoding of the decoded content stream based on the second set of quantization parameters and the bit usage of the first encoding;
    generating at least one transcoding control value based, at least in part, on a window of frames from the second encoding of the decoded content stream; and
    generating an output content stream based on the decoded content stream and the at least one transcoding control value.

23. The non-transitory computer-readable storage medium of claim 21, the rate-distortion model comprises parameters including input content stream quantization parameters and frame bits usage parameters.

24. The system of claim 22, wherein the window of frames comprises frames from the second encoding of the portion of the decoded content stream encompassed by a sliding window having a determined width of frames.

* * * * *